US006191928B1

(12) United States Patent
Rector et al.

(10) Patent No.: US 6,191,928 B1

(45) **Date of Patent: *Feb. 20, 2001**

(54) SURFACE-MOUNTABLE DEVICE FOR PROTECTION AGAINST ELECTROSTATIC DAMAGE TO ELECTRONIC COMPONENTS

(75) Inventors: Louis Rector, Allegany, NY (US); Hugh M. Hyatt, Bremerton, WA (US); Anthony Minervini, Orland Park, IL (US); Robert Swensen, Mt. Prospect, IL (US); Andrew J. Neuhalfen, Algonquin, IL (US); Andrew W. S. Elliott, Orinda, CA (US)

(73) Assignee: Littelfuse, Inc., Des Plaines, IL (US)

(*) Notice: Under 35 U.S.C. 154(b), the term of this patent shall be extended for 0 days.

This patent is subject to a terminal disclaimer.

(21) Appl. No.: 09/256,604

(22) Filed: Feb. 23, 1999

Related U.S. Application Data

(63) Continuation-in-part of application No. 08/474,940, filed on Jun. 2, 1995, now Pat. No. 6,023,028, which is a continuation-in-part of application No. 08/247,584, filed on May 27, 1994, now Pat. No. 5,552,757.

(51) Int. Cl.[7] .......... H02H 1/00

(52) U.S. Cl. .......... 361/127; 361/56; 361/111; 361/118

(58) Field of Search .......... 361/56, 111, 115, 361/127, 118, 58

(56) References Cited

U.S. PATENT DOCUMENTS

| | | | |
|---|---|---|---|
| 2,273,704 | 2/1942 | Grisdale . | |
| 3,619,725 | 11/1971 | Mendham et al. | 317/101 A |
| 3,685,026 | 8/1972 | Wakabayashi et al. . | |
| 3,685,028 | 8/1972 | Wakabayashi et al. . | |
| 4,045,712 | 8/1977 | De Tommasi . | |
| 4,164,725 | 8/1979 | Wiebe . | |
| 4,198,744 | 4/1980 | Nicolay | 29/623 |
| 4,252,692 | 2/1981 | Taylor et al. . | |
| 4,331,948 | 5/1982 | Malinaric et al. . | |
| 4,359,414 | 11/1982 | Mastrangelo . | |
| 4,503,415 | 3/1985 | Rooney | 337/160 |
| 4,514,718 | 4/1985 | Birx | 337/407 |
| 4,533,896 | 8/1985 | Belopolsky | 337/232 |
| 4,540,969 | 9/1985 | Sugar | 337/232 |
| 4,547,830 | 10/1985 | Yamauchi | 361/104 |
| 4,612,529 | 9/1986 | Gurevich | 337/255 |
| 4,626,818 | 12/1986 | Hilgers | 337/166 |
| 4,652,848 | 3/1987 | Hundrieser | 337/297 |

(List continued on next page.)

FOREIGN PATENT DOCUMENTS

| | | |
|---|---|---|
| 270954A1 | 6/1988 | (EP) . |
| 581428A1 | 2/1994 | (EP) . |
| 1604820 | 12/1981 | (GB) . |
| 2089148A | 6/1982 | (GB) . |

*Primary Examiner*—Stephen W. Jackson
(74) *Attorney, Agent, or Firm*—Bell, Boyd & Lloyd LLC

(57) ABSTRACT

The thin film, electrical device is an subminiature overvoltage circuit protection device in a surface mountable configuration for use in printed circuit board or thick film hybrid circuit technology. The surface mountable device (SMD) is designed to protect against electrostatic discharge (ESD) damage to electronic components. The circuit protection device comprises three material subassemblies. The first subassembly generally includes a substrate carrier, electrodes, and terminal pads for connecting the protection device 60 to a PC board. The second subassembly includes a voltage variable polymer material with nonlinear resistance characteristics, and the third subassembly includes a cover coat for protecting other elements of the circuit protection device. The devices of the present invention employ various electrode configurations and profiles to control the electrical field created between the electrodes and increase the active area of the electrodes in contact with the voltage variable material to enhance the electrical characteristics of the device.

34 Claims, 12 Drawing Sheets

U.S. PATENT DOCUMENTS

| | | | | |
|---|---|---|---|---|
| 4,720,402 | | 1/1988 | Wojcik | 427/282 |
| 4,726,991 | | 2/1988 | Hyatt et al. | 428/329 |
| 4,771,260 | | 9/1988 | Gurevich | 337/231 |
| 4,837,520 | | 6/1989 | Golke et al. | 324/550 |
| 4,873,506 | | 10/1989 | Guervich | 337/290 |
| 4,958,426 | | 9/1990 | Endo et al. | 29/623 |
| 4,975,551 | | 12/1990 | Syvertson | 200/144 |
| 4,977,357 | | 12/1990 | Shrier | 338/21 |
| 4,992,333 | | 2/1991 | Hyatt | 428/329 |
| 5,068,634 | | 11/1991 | Shrier | 338/21 |
| 5,084,691 | | 1/1992 | Lester et al. | 337/297 |
| 5,095,297 | | 3/1992 | Perreault et al. | 337/297 |
| 5,097,246 | | 3/1992 | Cook | 337/297 |
| 5,097,247 | | 3/1992 | Doerrwaechter | 337/405 |
| 5,099,380 | | 3/1992 | Childers et al. | 337/297 |
| 5,102,506 | | 4/1992 | Tanielian | 205/118 |
| 5,102,712 | | 4/1992 | Peirce et al. | 428/76 |
| 5,115,220 | | 5/1992 | Suuronen et al. | 337/297 |
| 5,140,295 | | 8/1992 | Vermot-gaud et al. | 337/297 |
| 5,142,263 | | 8/1992 | Childers et al. | 428/76 |
| 5,148,141 | | 9/1992 | Suuronen | 337/297 |
| 5,155,462 | | 10/1992 | Morrill | 337/3 |
| 5,166,656 | | 11/1992 | Badihi et al. | 337/297 |
| 5,183,698 | | 2/1993 | Childers et al. | 337/297 |
| 5,189,387 | | 2/1993 | Shrier et al. | 338/21 |
| 5,232,758 | | 8/1993 | Juskey et al. | 428/76 |
| 5,246,388 | | 9/1993 | Collins et al. | 338/21 |
| 5,248,517 | | 9/1993 | Shrier et al. | 338/21 |
| 5,260,848 | | 11/1993 | Childers | 337/297 |
| 5,262,754 | | 11/1993 | Collins | 338/21 |
| 5,278,535 | | 1/1994 | Xu et al. | 337/297 |
| 5,294,374 | | 3/1994 | Martinez et al. | 337/297 |
| 5,340,641 | | 8/1994 | Xu | 337/297 |
| 5,340,775 | | 8/1994 | Carruthers | 437/246 |
| 5,363,082 | | 11/1994 | Guervich | 337/227 |
| 5,374,590 | | 12/1994 | Batdorf | 437/173 |
| 5,393,597 | | 2/1995 | Childers et al. | 338/21 |
| 5,438,166 | | 8/1995 | Carey et al. | 174/261 |
| 5,476,714 | | 12/1995 | Hyatt | 337/166 |
| 5,537,108 | | 7/1996 | Nathan et al. | 340/825.84 |
| 5,592,016 | | 1/1997 | Go et al. | 257/530 |
| 5,669,381 | | 9/1997 | Hyatt | 337/297 |
| 5,781,395 | | 7/1998 | Hyatt | 337/297 |
| 5,807,509 | | 9/1998 | Shrier et al. | 338/21 |
| 6,023,028 | * | 2/2000 | Neuhalfen | 174/250 |

* cited by examiner

SURFACE-MOUNTABLE DEVICE FOR PROTECTION AGAINST ELECTROSTATIC DAMAGE TO ELECTRONIC COMPONENTS

CROSS-REFERENCE TO RELATED APPLICATIONS

The present application is a continuation-in-part of U.S. patent application Ser. No. 08/474,940 filed Jun. 7, 1995 now U.S. PAt. No. 6,023,028, which is a continuation-in-part of U.S. patent application Ser. No. 08/247,584, filed on May 27, 1994, and which issued on Sep. 3, 1996, as U.S. Pat. No. 5,552,757.

TECHNICAL FIELD

The present invention relates generally to surface-mountable devices (SMDs) for the protection of electrical circuits. More particularly, this invention relates to surface-mountable devices for protection against electrical overstress associated with electrostatic discharge, indirect lightning discharges, human and structural discharges, and electromagnetic pulse discharges within electrical circuits (hereafter collectively referred to as ESD).

BACKGROUND OF INVENTION

Printed circuit (PC) boards have found increasing application in electrical and electronic equipment of all kinds. The electrical circuits formed on these PC boards, like larger scale, conventional electrical circuits, need protection against electrical overvoltage. This protection is typically provided by commonly known electrostatic discharge devices that are physically secured to the PC board.

Examples of such a devices include silicon diodes and metal oxide varistor (MOV) devices. However, there are several problems with these devices. First, there are numerous aging problems associated with these types of devices, as is well known. Second, these types of devices can experience catastrophic failures, also as is well known. Third, these types of devices may burn or fail during a short mode situation. Numerous other disadvantages come to mind when using these devices during the manufacture of a PC board.

It has been found in the past that certain types of materials can provide protection against fast transient overvoltage pulses within electronic circuitry. These materials at least include those types of materials found in U.S. Pat. Nos. 4,097,834, 4,726,991, 4,977,357, and 5,262,754. However, the time and costs associated with incorporating and effectively using these materials in microelectronic circuitry is and has been significant. The present invention is provided to alleviate and solve these and other problems.

SUMMARY OF THE INVENTION

The present invention is a thin film, electrostatic discharge surface mounted device (ESD/SMD). According one aspect of the present invention there is an electrically insulating substrate having a first surface. First and second electrodes are disposed on the substrate surface. The electrodes are spaced apart from one another to form a gap. A portion of the substrate is removed to form a cavity in the gap region. A voltage variable material is disposed in the cavity and connects the first electrode to the second electrode.

According to various embodiments of the present invention, the electrodes and their profiles are selectively shaped to improve the electrical characteristics of the device. In general, the electrode profiles are rounded to eliminate edges and the build-up of electrical field concentrations associated electrode edges. In one embodiment, the electrodes are regrown to form a rounded profile and a greater thickness in the active electrode area, i.e., the surface area of the electrode in direct contact with the voltage variable material. In another embodiment the electrodes have a curvilinear periphery in the gap region. Preferably, the path distance of the curvilinear electrode peripheries is longer than rest of the electrode peripheries in order to increase the volume of the voltage variable material disposed between the electrodes. The electrode profiles can be sloped or stepped to form a containment region to increase the active electrode area. The electrode thickness can also be increased to form the containment region. By shaping the electrodes and their profiles according to the present invention devices having improved electrical characteristics can be achieved.

Other features and advantages of the invention will be apparent from the following specification taken in conjunction with the following drawings.

DETAILED DESCRIPTION OF THE INVENTION

Figure 1:
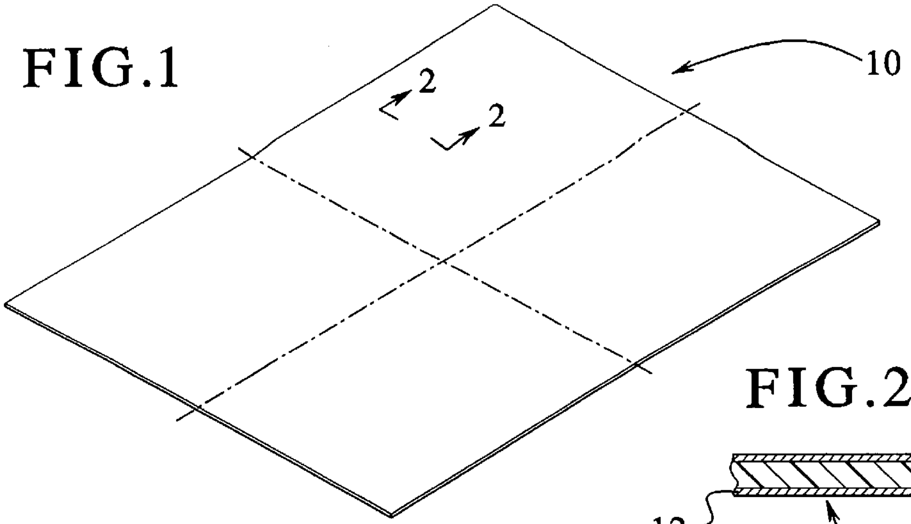
FIG. 1 is a perspective view of a copper-plated, FR-4 epoxy sheet used to make a subminiature ESD/SMDs in accordance with the present invention.

While this invention is susceptible of embodiments in many different forms, there is shown in the drawings and will herein be described in detail, a preferred embodiment of the invention with the understanding that the present disclosure is to be considered as an exemplification of the principles of the invention and is not intended to limit the broad aspects of the invention to the embodiment illustrated.

Figure 13:
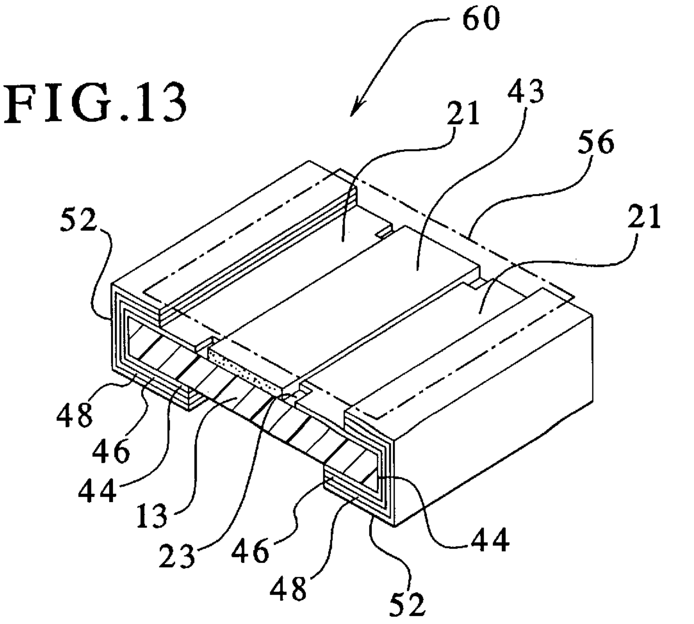
FIG. 13 shows the individual ESD/SMD in accordance with the invention as it is finally made, and after a so-called dicing operation in which a diamond saw is used to cut the strips along parallel planes to form the individual devices.

One preferred embodiment of the present invention is shown in FIG. 13. The thin film, circuit device is an subminiature overvoltage protection device in a surface mountable configuration for use in printed circuit board or thick film hybrid circuit technology. One given name for the device is an electrostatic discharge surface-mounted device (ESD/SMD).

The surface mountable device (SMD) is designed to protect against electrostatic discharge (ESD) damage to electronic components. The layout and design of the ESD/SMD device is such that it can be manufactured in many sizes. One standard industry size for surface mount devices, generally, is 125 mils. long by 60 mils. wide. This sizing is applicable to the present invention, and can be designated, for shorthand purposes, as "1206" sized devices. It will be understood, however, that the present invention can be used on all other standard sizes for surface mountable devices, such as 1210, 0805, 0603 and 0402 devices, as well as non-standard sizes. The protection device of the present invention are designed to replace silicon diodes and MOV technologies which are commonly used for low power protection applications.

The protection device generally comprises three material subassemblies. As will be seen, the first subassembly generally includes a substrate carrier or substrate 13, electrodes 21, and terminal pads 34, 36 for connecting the protection device 60 to the PC board. The second subassembly includes the voltage variable polymer material 43, and the third subassembly includes the cover coat 56.

The first or substrate carrier subassenmbly comprises a carrier base 13 having two electrodes 21 on the top surface which are separated by a gap 25 of controlled width W2, and wrap-around terminal pads 34, 36 on the top 57, bottom 58, and side 59 of the first subassembly 13. The second subassembly or voltage variable polymeric material 43 is applied between these two electrodes 21 and effectively bridges the gap 25. A cover coat 56 is placed over the polymeric material 43 and the electrodes 21 on the top surface 57 of the substrate subassembly, and partially on the top 57 of the terminal pads 34, 36. The third subassembly provides protection from impacts which may occur during automated assembly, and protection from oxidation and other effects during use.

More particularly, the first or substrate subassembly incorporates a carrier base 13 made of a semi-rigid epoxy material. This material exhibits physical properties nearly identical with the standard substrate material used in the printed circuit board industry, thus providing for extremely well matched thermal and mechanical properties between the device and the board. Other types of material can be used as well.

The first subassembly further includes two metal electrodes 21 which are a part of the pads 34, 36 as one continuous layer or film. As will be seen, the pads 34, 36 are made up of several layers, including a base copper layer 44 which also makes up the electrodes 21, a supplemental copper layer 46, a nickel layer 48, and a tin-lead layer 52 to make up the rest of the pads 34, 36. In another embodiment, the supplemental copper layer 46 also makes up a second copper layer of the electrodes 21 (not shown), thereby increasing the thickness of the electrodes 21. The base copper layer of the pads and the electrodes are simultaneously deposited by (1) electrochemical processes, such as the plating described in the preferred embodiment below; or (2) by physical vapor deposition (PVD). Such simultaneous deposition ensures a good conductive path between the pads 34, 36, electrodes 21, and second subassembly 43 when an overvoltage situation occurs. This type of deposition also facilitates manufacture, and permits very precise control of the thickness of the layers, including the electrodes 21. After initial placement of the base copper 44 onto the substrate or core 13, additional layers 46, 48, 52 of a conductive metal are placed onto the terminal pads, as mentioned above. These additional layers could be defined and placed onto these pads by photolithography and deposition techniques, respectively.

The two metal electrodes, whether one or two layers (or more) thick are separated by a gap 25 of a controlled width W2. The substrate subassembly also contains and supports the two (2) terminal pads 34, 36 on the top 57, bottom 58, and sides 59 of the protection device. These bottom 58 and/or sides 59 of the terminal pads 34, 36 serve to attach the device to the board and provide an electrical path from the board to the electrodes 21. Again, the electrodes 21 and the terminal pads consist of a copper sheet 44 laminated to the case substrate material 13. The other layers are deposited, either electrochemically or physical vapor deposition (PVD), simultaneously to ensure a good, continuous conductive path between the electrodes on the top surface of the substrate, and the terminal pads 34, 36 on the bottom of the substrate 13. This configuration allows for ease of manufacture for surface mount assembly techniques to allow for a wrap around configuration of the terminal pads. The gap width W2 between the electrodes 21 are defined by photolithographic techniques and through an etching process. The nature of the photolithographic process allows for very precise control of the width W2 of the separation of the electrode metallization. The gap 25 separating the electrodes 21 extends on a straight line across the top surface of the substrate 13. Proper sizing and configuration of the gap provides for proper trigger voltages and clamping voltages along with fast response time and reliable operation during an overvoltage condition. The electrode metallization can be selected from a variety of elemental or alloy materials, i.e. Cu, Ag, Ni, Ti, Al, NiCr, Tin, etc., to obtain coatings which exhibit desired physical, electrical, and metallurgical characteristics.

Photolithography, mechanical, or laser processing techniques are employed for defining the physical dimensions and width of the gap 25 and of the terminal pads 34, 36.

Subsequent photolithography and deposition operations are employed to deposit additional metallization to the terminal pads, i.e. Cu, Ni, and Sn/Pb, to a specified thickness.

The voltage variable polymeric material 43 provides the protection from fast transient overvoltage pulses. The polymeric material 43 provides for a non-linear electrical response to an overvoltage condition. The polymer 43 is a material comprising finely divided particles dispersed in an organic resin or an insulating medium. The polymeric material 43 consists of conductive particles which are uniformly dispersed throughout an insulating binder. This polymer material 43 exhibits a non-linear resistance characteristic which is dependent on the particle spacing and the electrical properties of the binder. This polymer material is available from many sources and is disclosed by a variety of patents as was mentioned above.

The cover coat 56 subassembly is applied after the metal deposition, pattern definition, and polymer 43 application process, to the top surface of the substrate/polymer subassembly to provide a means for protecting the polymeric material 43 and to provide a flat top surface for pick-and-place surface mount technology automated assembly equipment. The cover coat 56 prevents excessive oxidation of the electrodes 21 and the polymer 43 which can degrade the performance of the protection device 60. The cover coat 56 can be comprised of a variety of materials including plastics, conformal coatings, polymers, and epoxies. The cover coat 56 also serves as a vehicle for marking the protective devices 60 with the marking being placed between separate layers, or on the surface of the cover coat 56 through an ink transfer process or laser marking.

Figure 2:
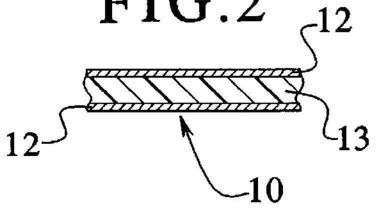
FIG. 2 is a cross-sectional view of a portion of the sheet of FIG. 1, and taken along lines 2—2 of FIG. 1.

This protective device 60 may be made by the following process. Shown in FIGS. 1 and 2 is a solid sheet 10 of an FR-4 epoxy with copper plating 12. The copper plating 12 and the FR-4 epoxy core 13 of this solid sheet 10 may best be seen in FIG. 2. This copper-plated FR-4 epoxy sheet 10 is available from Allied Signal Laminate Systems, Hoosick Falls, N.Y., as Part No. 0200BED130C1/C1GFN0200 C1/C1A2C. Although FR-4 epoxy is a preferred material, other suitable materials include any material that is compatible with, i.e., of a chemically, physically and structurally similar nature to, the materials from which PC boards are made, as mentioned above. Thus, another suitable material for this solid sheet 10 is polyimide. FR-4 epoxy and polyimide are among the class of materials having physical properties that are nearly identical with the standard substrate material used in the PC board industry. As a result, the protective device 60 and the PC board to which that protection device 60 is secured have extremely well-matched thermal and mechanical properties. The substrate of the protective device 60 of the present invention also provides desired arc-tracking characteristics, and simultaneously exhibits sufficient mechanical flexibility to remain intact when exposed to the rapid release of energy associated with overvoltage.

In the next step of the process of manufacturing the protective devices 60, the copper plating 12 is etched away from the solid sheet 10 by a conventional etching process. In this conventional etching process, the copper is etched away from the substrate by a ferric chloride solution.

Although it will be understood that after completion of this step, all of the copper layer 12 of FIG. 2 is etched away from FR-4 epoxy core 13 of this solid sheet 10, the remaining epoxy core 13 of this FR-4 epoxy sheet 10 is different from a "clean" sheet of FR-4 epoxy that had not initially been treated with a copper layer. In particular, a chemically etched surface treatment remains on the surface of the epoxy core 13 after the copper layer 12 has been removed by etching. This treated surface of the epoxy core 13 is more receptive to subsequent operations that are necessary in the manufacture of the present surface-mounted subminiature protective device 60.

Figure 3:
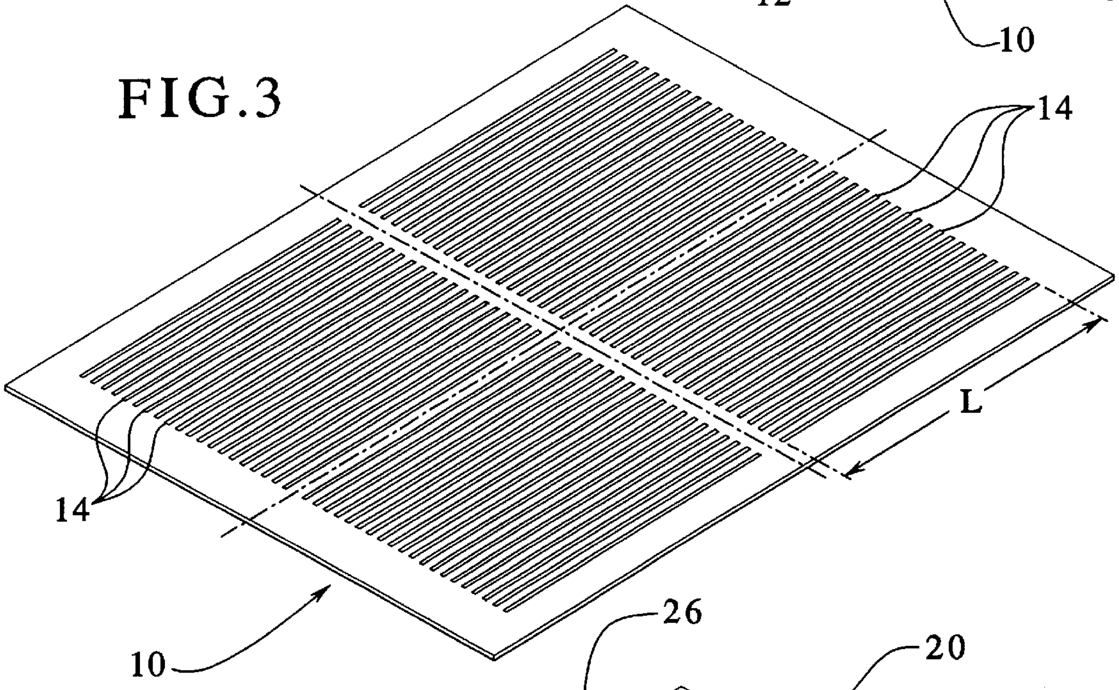
FIG. 3 is a perspective view of the FR-4 epoxy sheet of FIG. 1, but stripped of its copper plating, and with a plurality of slots, each having a width W1 and a length L, routed into separate quadrants of that sheet.

The FR-4 epoxy sheet 10 having this treated, copper-free surface is then routed or punched to create slots 14 along quadrants of the sheet 10, as may be seen in FIG. 3. Dotted lines visually separate these four quadrants in FIG. 3. The width W1 of the slots 14 (FIG. 4) is about 0.0625 inches. The length L of each of the slots 14 (FIG. 3) is approximately 5.125.

When the routing or punching has been completed, the etched and routed or punched sheet 10 shown in FIG. 3 is again plated with copper. This reapplication of copper occurs through the immersion of the etched and routed sheet of FIG. 3 into an electroless copper plating bath. This method of copper plating is well-known in the art.

This copper plating step results in the placement of a copper layer having a uniform thickness along each of the exposed surfaces of the sheet 10. For example, as may be seen in FIG. 4, the copper plating 18 resulting from this step covers both (1) the flat, upper surfaces 22 of the sheet 10; and (2) the vertical, interstitial regions 16 that define at least a portion of the slots 14. These interstitial regions 16 must be copper-plated because they will ultimately form a portion of the terminal pads 34, 36 of the final protection device 60. The uniform thickness of the copper plating will depend upon the ultimate needs of the user.

Figure 4:
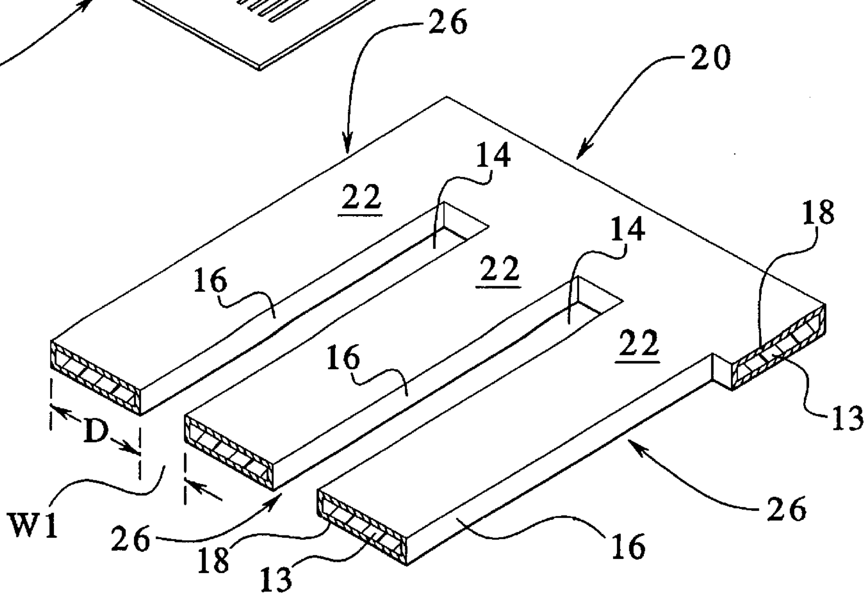
FIG. 4 is an enlarged, cut-away perspective view of a portion of the routed sheet of FIG. 3, but with a copper plating layer having been reapplied.

After plating has been completed, to arrive at the copper-plated structure of FIG. 4, the entire exposed surface of this structure is covered with a so-called photoresist polymer.

An otherwise clear mask is placed over the replated copper sheet 20 after it has been covered with the photoresist.

Patterned panels are a part of, and are evenly spaced across, this clear mask. These patterned panels are made of an UV light-opaque substance, and are of a size and shape corresponding to the size and shape generally of the patterns 30 shown in FIG. 5. Essentially, by placing this mask having these panels onto the replated copper sheet 20, several portions of the flat, upward-facing surfaces 22 of the replated copper sheet 20 are effectively shielded from the effects of UV light.

Figure 15:
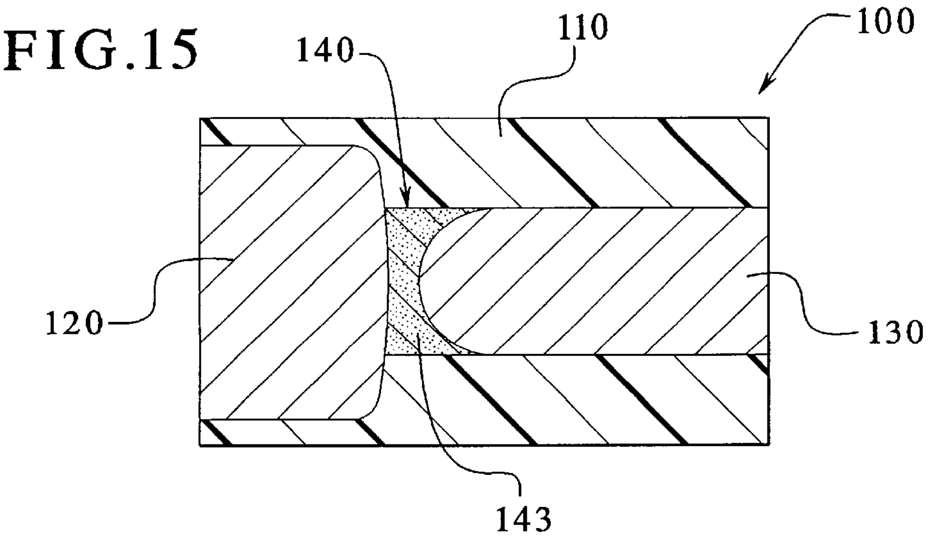
FIGS. 15–22 illustrate top views of devices having electrodes configurations according to the present invention.

It will be understood from the following discussion that the pattern 30 will essentially define the shapes and sizes of the electrodes 21 and polymer strip 43. A later step defines the remainder of terminal pads 34, 36. It will be appreciated that the width, length and shape of the electrodes 21 and polymer strip 43 may be altered by changing the size and shape of the UV light opaque panel patterns. In particular, one embodiment of the present invention includes having curved corners 19 (as shown in FIG. 15) instead of sharp corners 19 as shown. In fact, it has been seen that it is preferable to curve the corners 19.

This step, therefore, defines the gap 25 between the electrodes 21, as well as the notches 23 in the electrodes 21. As mentioned above, photolithographic, mechanical, and laser processing techniques can be employed to configure very small, intricate, and complex electrode 21 and gap 25 geometries. The electrode 21 configuration can be conveniently modified to obtain specific electrical characteristics in resultant protective devices 60.

The gap width W2 can be changed to provide control of triggering and clamping voltages during an overload event.

For example, gap widths in the devices of the present invention are preferably in a range of less than 1 mil up to approximately 25 mils. The indicated device construction results in a triggering and clamping voltage rating similar to devices of previous construction. Tests have been conducted with peak voltages of 2 kV, 4 kV, and 8 kV as the ESD waveform. The use of a 2 mil and 4 mil gap width resulted in triggering voltages of 100–150 V and clamping voltages of 30–50 V.

Additionally within this step, the backside of the sheet is covered with a photoresist material and an otherwise clear mask is placed over the replated copper sheet 20 after it has been covered with the photoresist. A rectangular panel is a part of this clear mask. The rectangular panels are made of a UV light-opaque substance, and are of a size corresponding to the size of the panel 28 shown in FIG. 6. Essentially, by placing this mask having these panels onto the replated copper sheet 20, several strips of the flat, downward-facing surfaces 28 of the replated copper sheet 20 are effectively shielded from the effects of the UV light.

Figure 6:
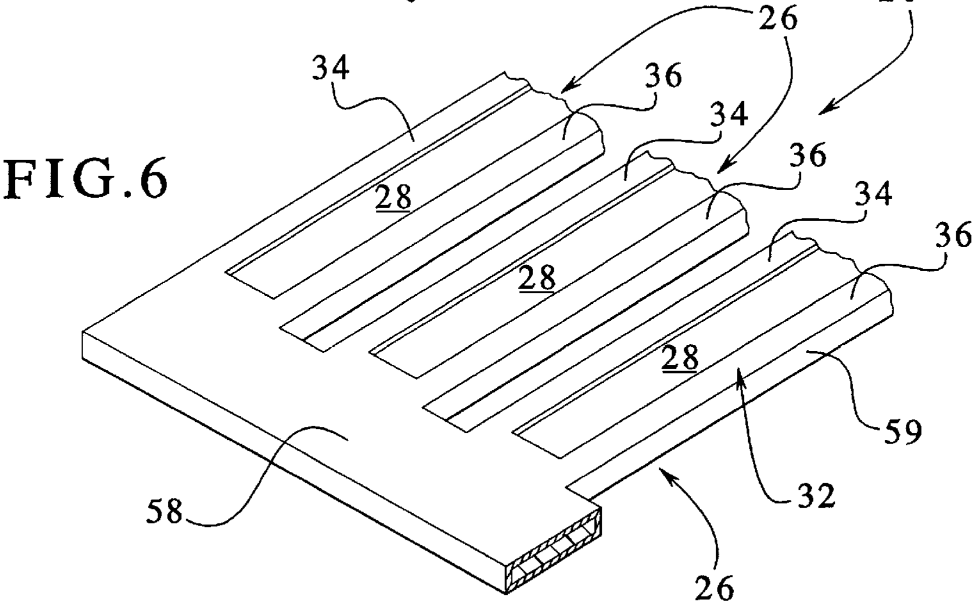
FIG. 6 is a perspective view of the reverse side of FIG. 5, but after the removal of a strip-like portion of copper plating from the replated sheet of FIG. 5.

The rectangular panels will essentially define the shapes and sizes of the wide terminal pads 34 and 36 and the lower middle portion 28 of the bottom 58 of the strip 26. Thus, the copper plating from a portion of the bottom 58 of a strip 26 is defined by a photoresist mask. Particularly, the copper plating from the lower, middle portion 28 of the bottom 58 of the strip 26 is removed. A perspective view of this section of this replated sheet 20 is shown in FIG. 6.

The entire replated, photoresist-covered sheet 20, i.e., the top 57, bottom 58, and sides 59 of that sheet 20, is then subjected to UV light. The replated sheet 20 is subjected to the UV light for a time sufficient to ensure curing of all of the photoresist that is not covered by the square panels and rectangular strips of the masks. Thereafter, the masks containing these square panels and rectangular strips are removed from the replated sheet 20. The photoresist that was formerly below these square panels remains uncured. This uncured photoresist may be washed from the replated sheet 20 using a solvent.

The cured photoresist on the remainder of the replated sheet 20 provides protection against the next step in the process. Particularly, the cured photoresist prevents the removal of copper beneath those areas of cured photoresist. The regions formerly below the patterned panels have no cured photoresist and no such protection. Thus, the copper from those regions can be removed by etching. This etching is performed with a ferric chloride solution.

Figure 5:
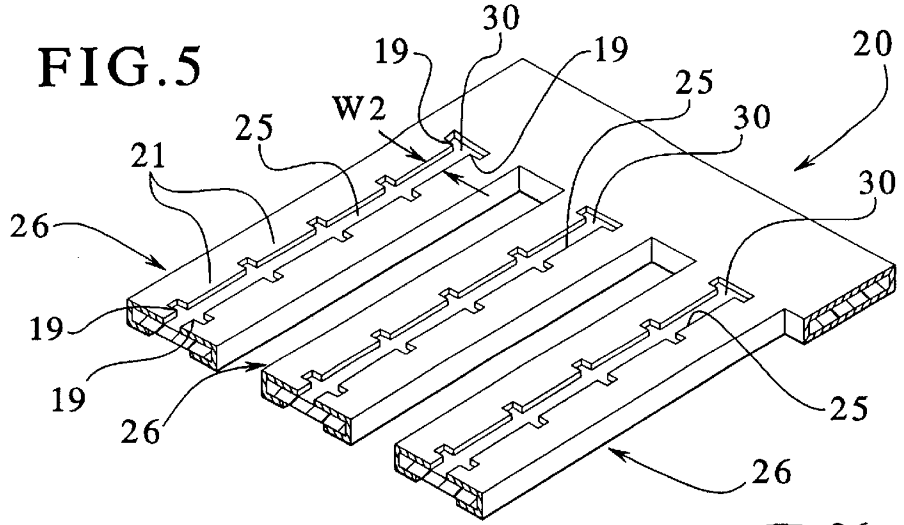
FIG. 5 is a top perspective view of several portions of the flat, upward-facing surfaces of the replated copper sheet from FIG. 4, after each of those portions were masked with a patterned panel of an ultraviolet (UV) light-opaque substance.

After the copper has been removed, as may be seen in FIGS. 5 and 6, the regions formerly below the patterned panels and the rectangular strips of the mask are not covered at all. Rather, those regions now comprise areas 28 and 30 of clear epoxy.

The replated sheet 20 is then placed in a chemical bath to remove all of the remaining cured photoresist from the previously cured areas of that sheet 20.

For the purposes of this specification, the portion of the sheet 20 between adjacent slots 14 is known as a strip 26. This strip has a dimension D as shown in FIG. 4 which defines the length of the device. After completion of several of the operations described in this specification, this strip 26 will ultimately be cut into a plurality of pieces, and each of these pieces becomes an ESD/SMD or protective device 60 in accordance with the invention.

As may also be seen from FIG. 6, the underside 58 of the strip 26 has regions along its periphery which still include copper plating. These peripheral regions 34 and 36 of the underside 58 of the strip 26 form portions of the pads. These pads will ultimately serve as the means for securing the entire, finished protective device 60 to the PC board.

Figure 7:
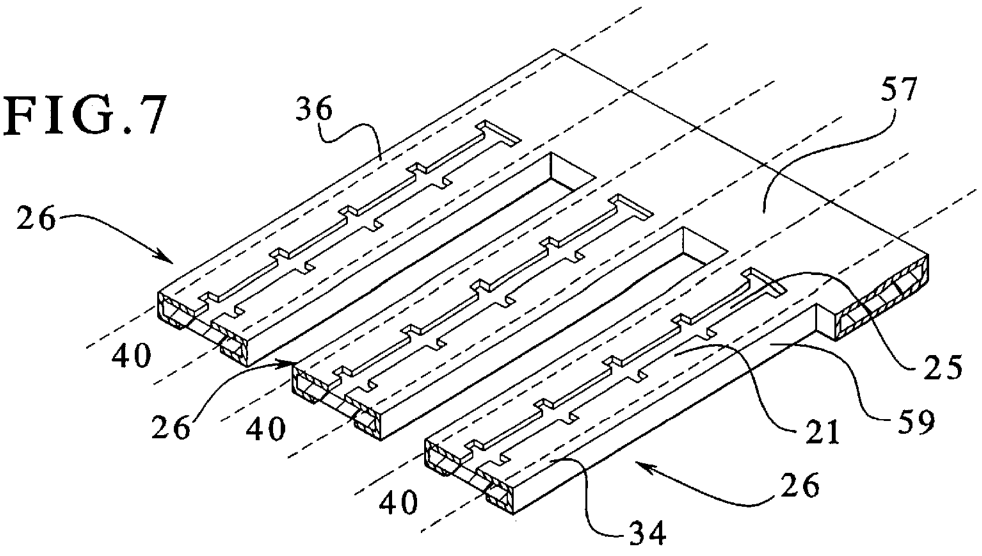
FIG. 7 is a perspective view of the top 57 of the strips 26 of FIG. 6, and showing linear regions 40 defined by dotted lines.

FIG. 7 is a perspective view of the top-side 57 of the strips 26 of FIG. 6. Generally opposite and coinciding with the lower, middle portions 28 of these strips 26 are linear regions 40 on this top-side 38. These linear regions 40 are defined by the dotted lines of FIG. 7.

FIG. 7 is to be referred to in connection with the next step in the manufacture of the invention. In this next step, a photoresist polymer is placed along each of the linear regions 40 of the top side 57 of the strips 26. Through the covering of these linear regions 40, photoresist polymer is also placed along the gap 25 and electrodes 21. These electrodes 21 are made of a conductive metal, here copper. The photoresist is then treated with UV light, resulting in a curing of the photoresist onto linear region 40.

As a result of the curing of this photoresist onto the linear region 40, metal will not adhere to this linear region 40 when the strip 26 is dipped into an electrolytic bath containing a metal for plating purposes.

In addition, as explained above, the middle portion 28 of the underside 58 of the strip 26 will also not be subject to plating when the strip 26 is dipped into the electrolytic plating bath. Copper metal previously covering this metal portion had been removed, revealing the bare epoxy that forms the base of the sheet 20. Metal will not adhere to or plate onto this bare epoxy using an electrolytic plating process.

Figure 8:
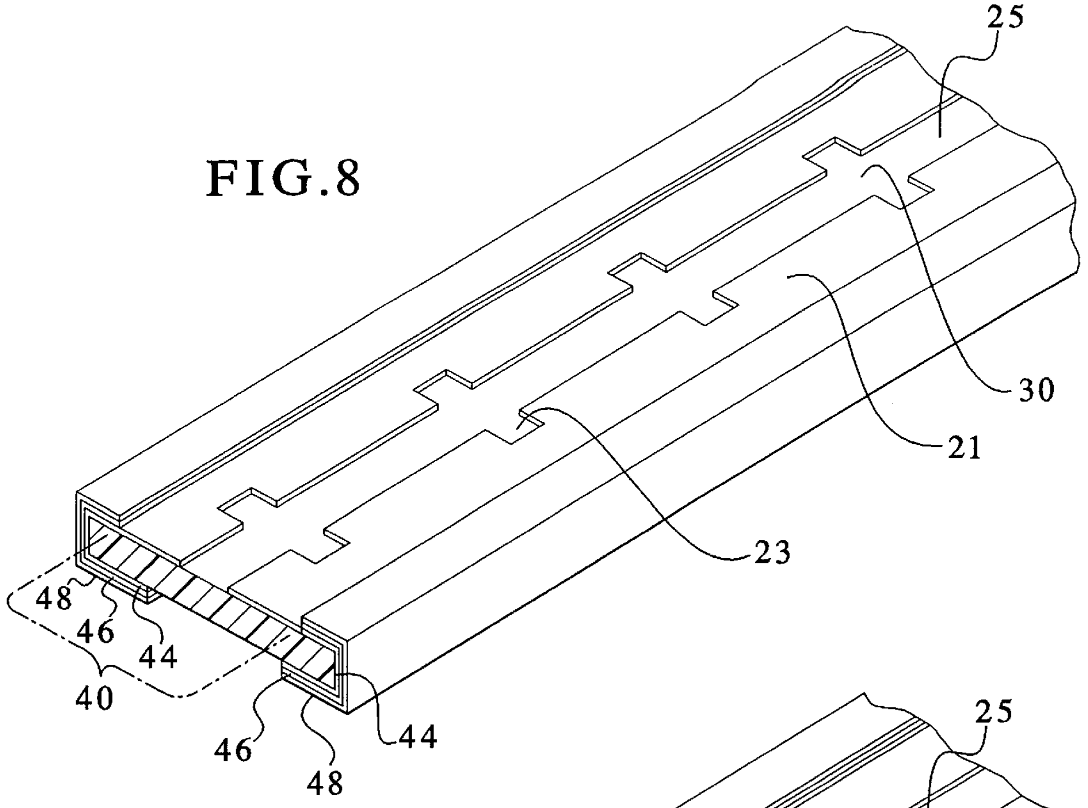
FIG. 8 is a view of a single strip 26 after dipping into a copper plating bath and then a nickel plating bath, with the result that additional copper layer and a nickel layer are deposited onto the terminal-pads portions of the base copper layer.
Figure 9:
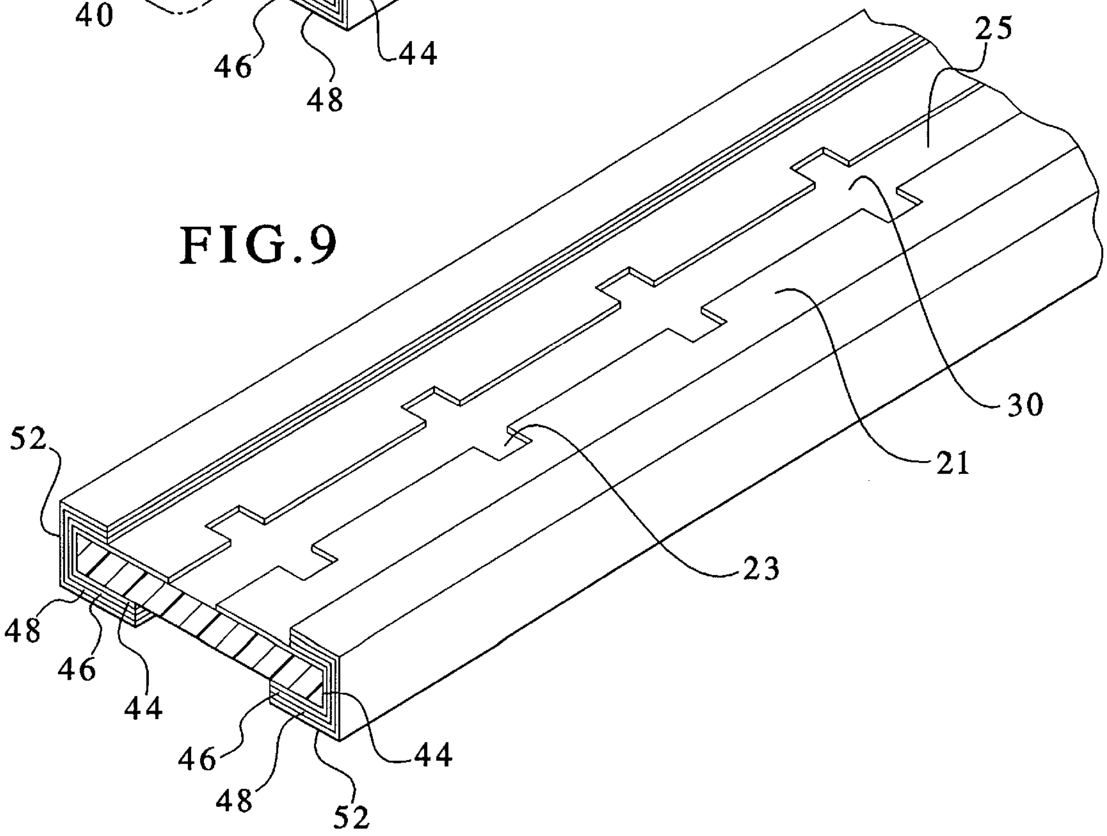
FIG. 9 is a perspective view of the strip of FIG. 8, but after immersion into a tin-lead bath to create another layer over the copper and nickel layers of the terminal pads.

The entire strip 26 is dipped into an electrolytic copper plating bath and then an electrolytic nickel plating bath. As a result, as may be seen in FIG. 8, copper 46 and nickel layers 48 are deposited on the base copper layer 44. After deposition of these copper 46 and nickel layers 48, an additional tin-lead layer 52 is deposited in these same areas through an electrolytic tin-lead bath as shown in FIG. 9. The cured photoresist polymer on the linear region 40 is then removed.

Figure 10:
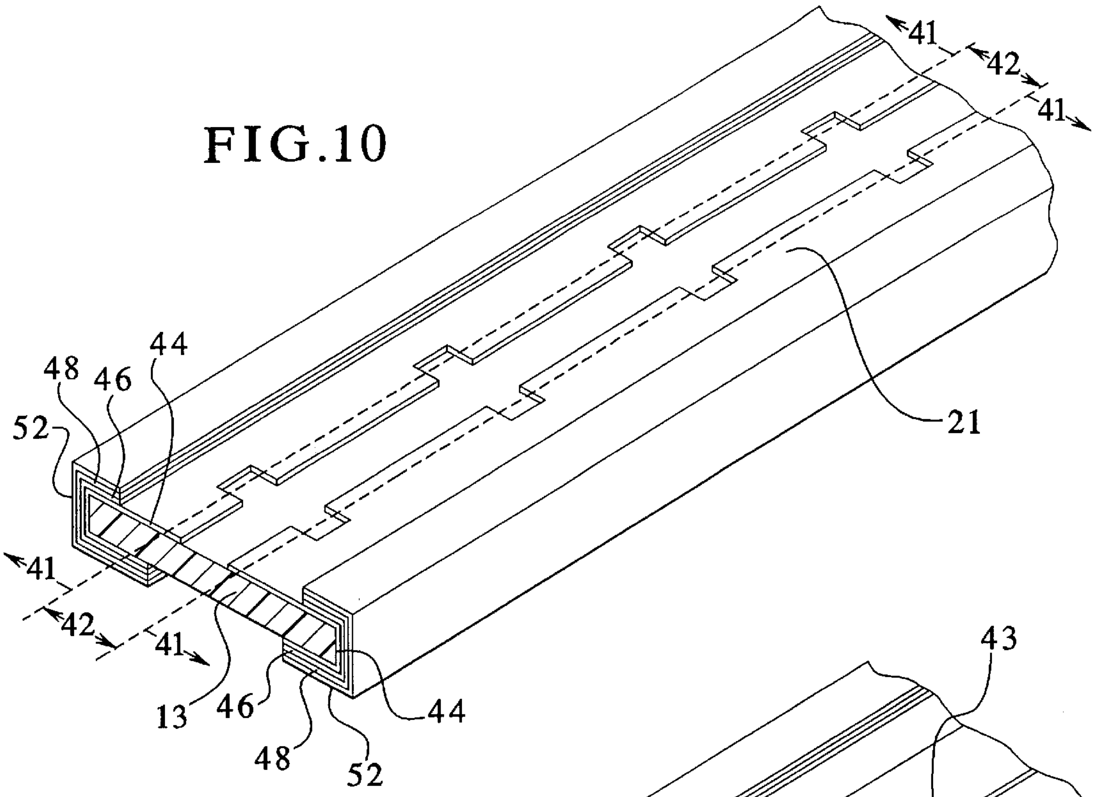
FIG. 10 shows the strip of FIG. 9, depicting the region where the voltage variable polymeric strip will be applied.
Figure 11:
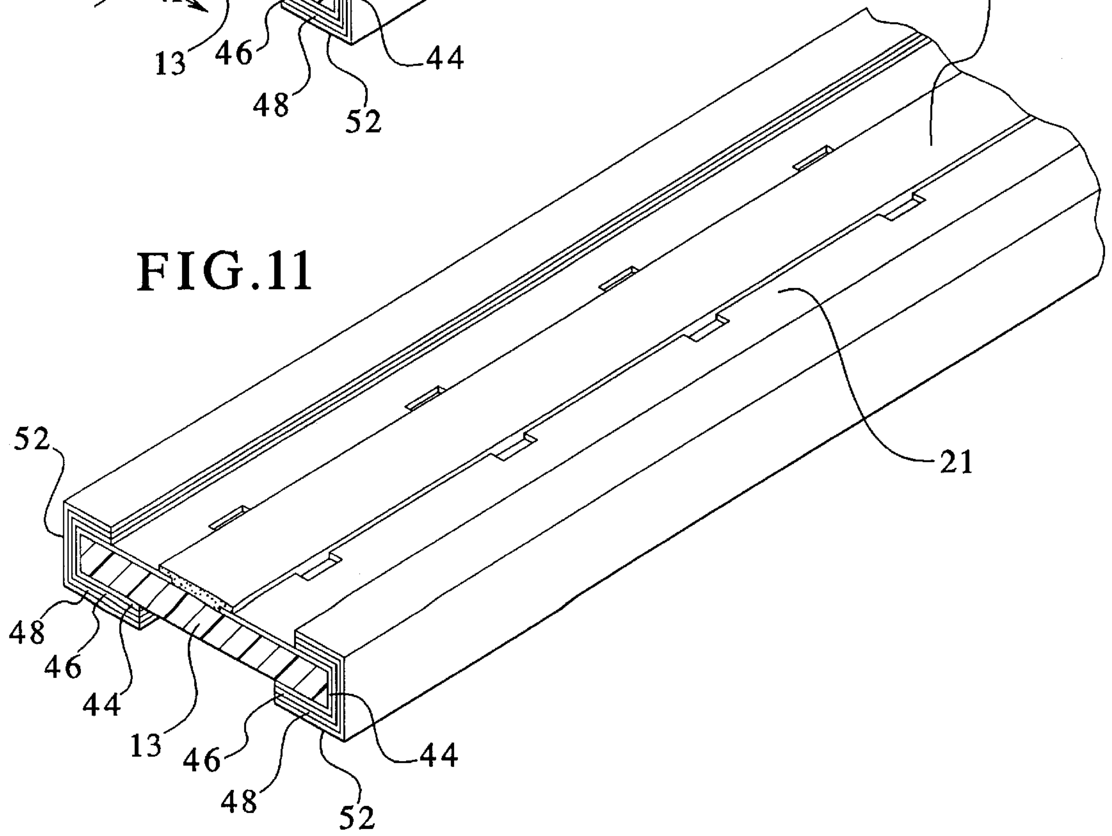
FIG. 11 shows the strip of FIG. 10, but with an added polymeric material 43 into the gap 25 of the strip 26.

As shown in FIGS. 10 and 11, the polymer material 43 is then applied. The polymer 43 can be applied in a number of ways. For example, the polymer 43 can be applied using the stencil printing machine shown in FIG. 14 in a manner similar to the use of the stencil printing described further below. In addition, the polymer 43 can be applied manually with a tube of the polymer 43. Other automated means for applying the polymer 43 are possible as well. Once the polymer 43 has been applied and deposited within region 42, and in between regions 41, the sheet 20 is heat cured to solidify the polymer 43 to obtain strips 26 that look like the strip 26 in FIG. 11.

Figure 12:
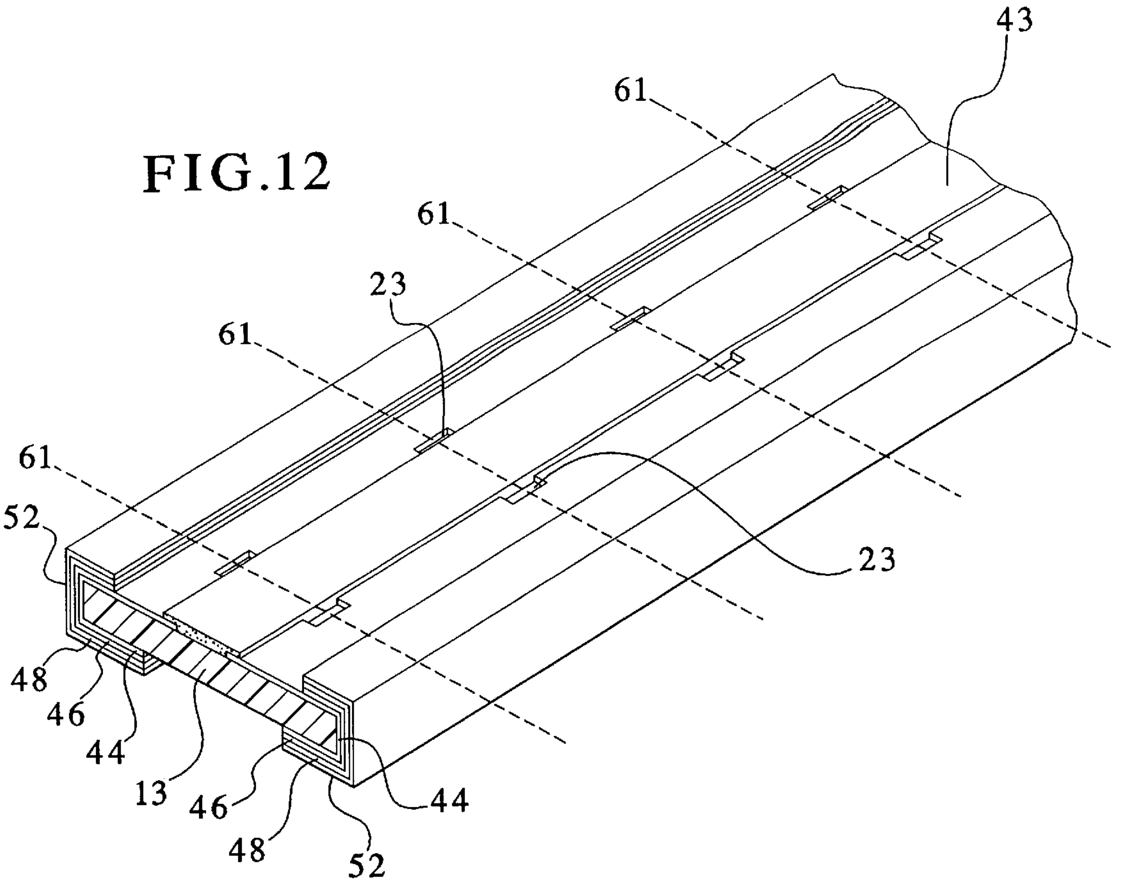
FIG. 12 shows the strip of FIG. 11, but with an added cover coat 56 over the electrodes 21 and polymeric material 43.

The next step in the manufacture of the protective device 60 is the placement, across the length of the most of the top 57 of the strip 26, of a protective layer 56 (FIG. 12). This protective layer 56 is the third subassembly of the present protective device 60, and forms a relatively tight seal over the electrodes 21 and polymer strip 43 area. In this way, the protective layer 56 provides protection from oxidation and impacts during attachment to the PC board. This protective layer also serves as a means of providing for a surface for pick and place operations which use a vacuum pick-up tool.

This protective layer 56 helps to control the melting, ionization and arcing which occur in the fusible link 42 during current overload conditions. The protective layer 56 or cover coat material provides desired arc-quenching characteristics, especially important upon interruption of the fusible link 42.

The application of the cover coat 56 is such that it can be performed in a single processing step using a simple fixture to define the shape of the body of the device. This method of manufacture provides for advantages over current methodologies in protecting the electrodes 21, gap 25, and polymer 43 from physical and environmental damage. The application of the conformal coating 56 is performed in such a fashion that the physical location of the electrode gap 25 is not critical, as in a clamping or die mold method. The conformal coating may be mixed with a colored dye prior to application to provide for a color-coded voltage rated protective device 60.

The protective layer 56 may be comprised of a polymer, preferably a polyuretane gel or paste when a stencil printing cover coat application process is used, and preferably a polycarbonate adhesive when an injection mold cover coat application process is used. A preferred polyurethane is made by Dymax. Other similar gels, pastes, and adhesives are suitable for the invention depending on the cover coat application process used. In addition to polymers, the protective layer 56 may also be comprised of plastics, conformal coatings and epoxies.

Figure 14:
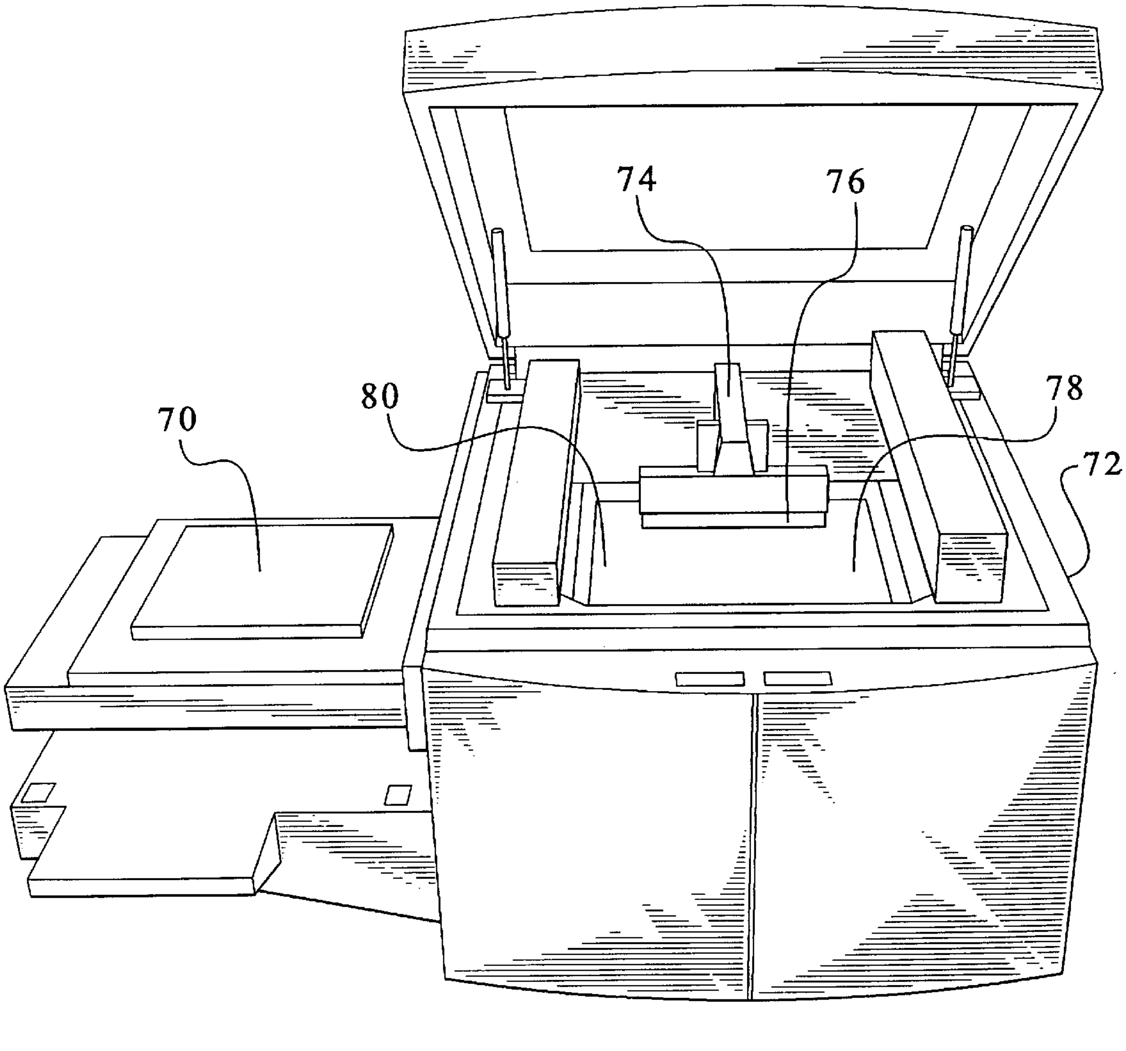
FIG. 14 is a front view of the stencil printing machine used to perform the stencil printing step of the ESD/SMD manufacturing process.

This protective layer 56 is applied to the strips 26 using a stencil printing process which includes the use of a common stencil printing machine shown in FIG. 14. It has been found that stencil printing is faster than some alternative processes for applying the cover coat 56, such as with an injection mold process using die molds. Specifically, it has been found that the use of a stencil printing process while using a stencil printing machine, at least, doubles production output from the injection mold operation. The stencil printing machine is made by Affiliated Manufacturers, Inc. of Northbranch, N.J., Model No. CP-885.

In the stencil printing process, the material is applied to all of the strips 26 in one quadrant of the sheet 20, simultaneously. Using the stencil print process, the material cured much faster than the injection mold process because the cover coat material is directly exposed to the UV radiation, while the UV light must travel through a filter in the injection mold process. Furthermore, the stencil printing process produces a more uniform cover coat than the injection filling process, in terms of the height and the width of the cover coat 56. Because of that uniformity, the fuses can be tested and packaged in a relatively fast automated process. With the injection filling process it may be difficult to precisely align the protective devices 60 in testing and packaging equipment due to some non-uniform heights and widths of the cover coat 56.

The stencil printing machine comprises a slidable plate 70, a base 72, a squeegee arm 74, a squeegee 76, and an overlay 78. The overlay 78 is mounted on the base 72 and the squeegee 76 is movably mounted on the squeegee arm 74 above the base 72 and overlay 78. The plate 70 is slidable underneath the base 72 and overlay 78. The overlay 78 has parallel openings 80 which correspond to the width of the cover coat 56.

The stencil printing process begins by attaching an adhesive tape under the sheet 20. The sheet 20, with the adhesive tape attached, is placed on the plate 70 with the adhesive tape between the plate 70 and the fuse sheet 20. The cover coat 56 material is then applied with a syringe at one end of the overlay 78. The plate 70 slides underneath the overlay 78 and lodges the sheet 20 underneath the overlay 78 in correct alignment with the parallel openings 80. The squeegee 76 then lowers to contact the overlay 78 beyond the material on the top of the overlay 78. The squeegee 76 then moves across the overlay 78 where the openings 80 exist, thereby forcing the cover coat 56 material through the openings 80 and onto each of the strips 26 of the sheet 20. Thus, the cover coat now covers the electrodes 21, the gap, 25, and the polymer strip 43 (FIGS. 12 and 13). The squeegee 76 is then raised, and the sheet 20 is unlodged from the overlay 78. The openings 80 in the overlay 78 are wide enough so that the protective layer partially overlaps the pads 34, 36, as shown in FIGS. 12 and 13. In addition, the material used as the cover coat material should have a viscosity in the paste or gel region so that after the material is spread onto the sheet 20, it will flow in a manner which creates a generally flat top surface 49, but such that the material 56 will not flow into the slots 14. The sheet 20 of strips 26 are then UV cured in a UV chamber. At the end of this curing, the polyurethane gel or paste has solidified, forming the protective layer 56 (FIGS. 12 and 13).

Although a colorless, clear cover coat is aesthetically pleasing, alternative types of cover coats may be used. For example, colored, clear or transparent cover coat materials may be used. These colored materials may be simply manufactured by the addition of a dye to a clear cover coat material. Color coding may be accomplished through the use of these colored materials. In other words, different colors of the cover coat can correspond to different ratings, providing the user with a ready means of determining the rating of any given protective device 60. The transparency of both of these coatings permit the user to visually inspect the polymer strip 43 prior to installation, and during use.

The strips 26 are then ready for a so-called dicing operation, which separates those strips 26 into individual fuses. In this dicing operation, a diamond saw or the like is used to cut the strips 26 along parallel planes 61 (FIG. 12) into individual thin film surface-mounted fuses 60 (FIG. 13). The cuts bisect the notches 23 in the electrodes 21. At this point, it can more easily be understood that the metallization of the electrodes 21 is removed from the notches 23 or notched areas 23. Specifically, it is easier to cut through notched areas 23 without the electrodes. In addition, during dicing, curling of the metallization may take place along the cut, thereby causing a curl of metal (part of an electrode) to move into the gap area and effectively reduce the gap width W2. Putting the notches 23 in the places where the dicing is to take place alleviates this possible problem and other possible problems. It should be noted that the notches 23 can extend further toward the pads 34, 36, and that the comers 19 of the notches 23 can be curved in alternative embodiments.

This cutting operation completes the manufacture of the thin film protective device 60 (FIG. 13) of the present invention.

All of the preceding features combine to produce an ESD/SMD device assembly which exhibits improved control of triggering and clamping voltage characteristics by regulating electrode and gap geometries, and the polymer 43 composition. The dimensional control aspects of the deposition and photolithographic processes, coupled with the proper selection of electrode and polymer 43 material, provide for consistent triggering and clamping voltages.

In addition to improving the control of triggering and clamping voltages, it has been determined that overshoot can be minimized and the reproducibility and reliability of an overvoltage circuit protection device can be improved by shaping electrodes to minimize electrical field concentrations. In addition, by utilizing various electrode configurations to increase the volume of the material in contact with the active area of the electrodes one can improve the energy rating of an overvoltage circuit protection device.

Figure 16:
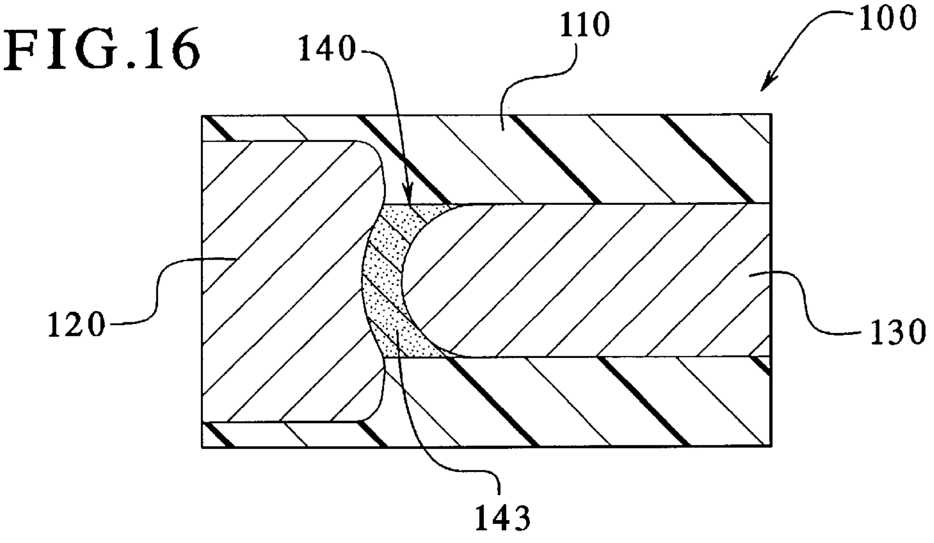
Figure 17:
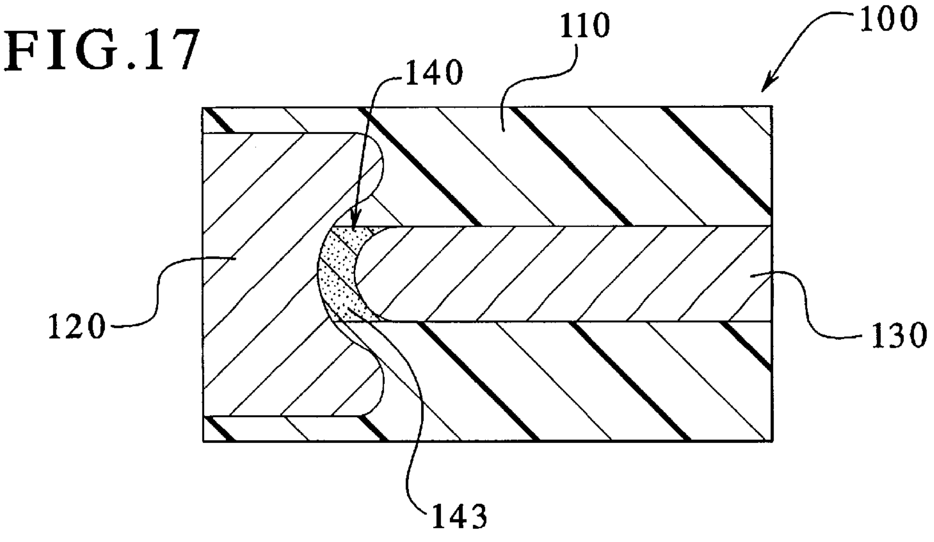
Figure 18:
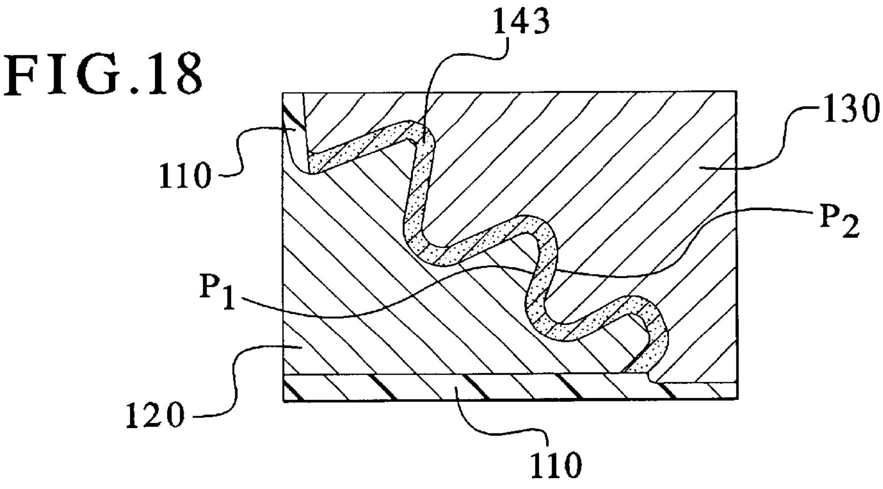
Figure 19:
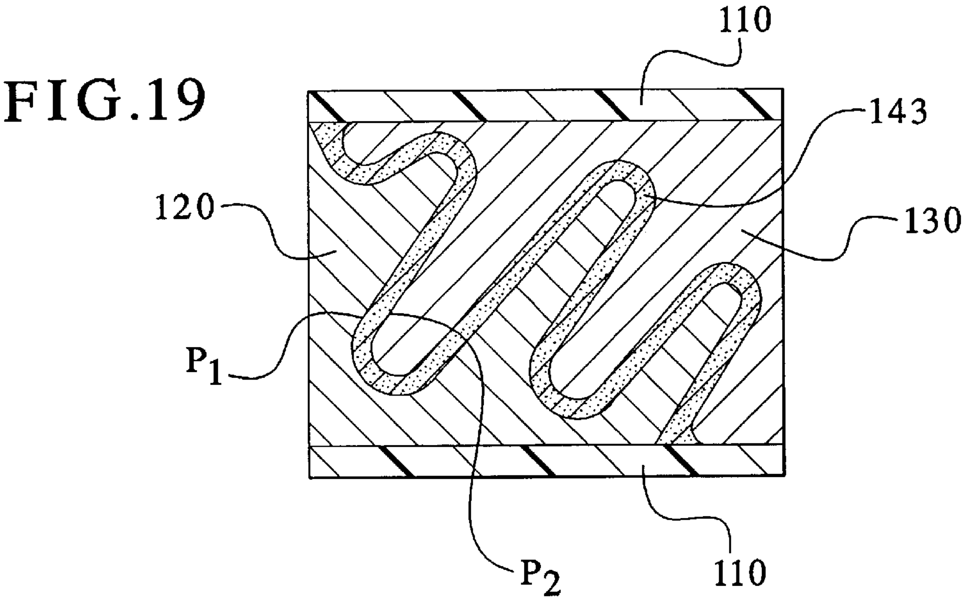
Figure 20:
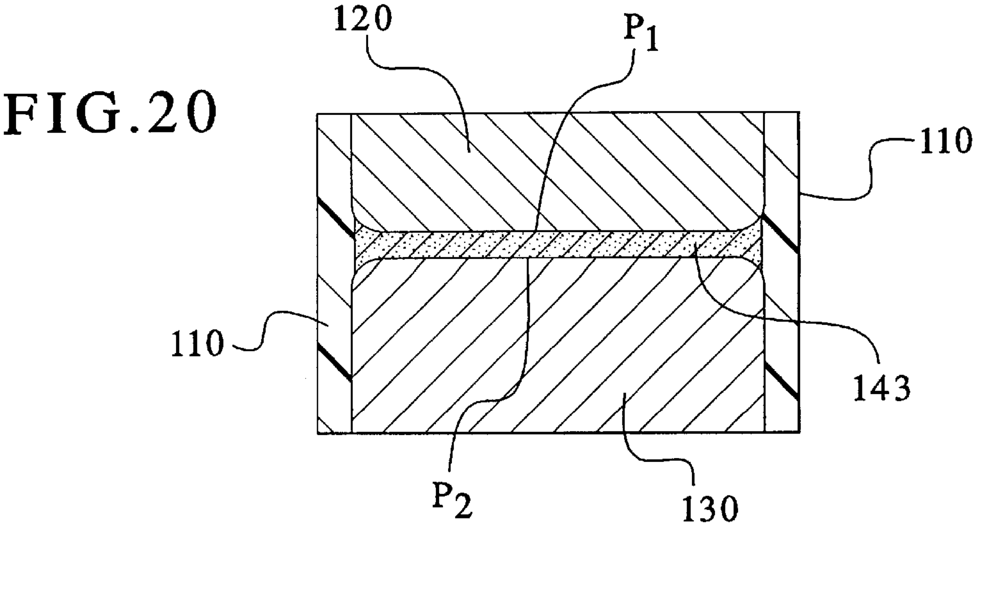
Figure 21:
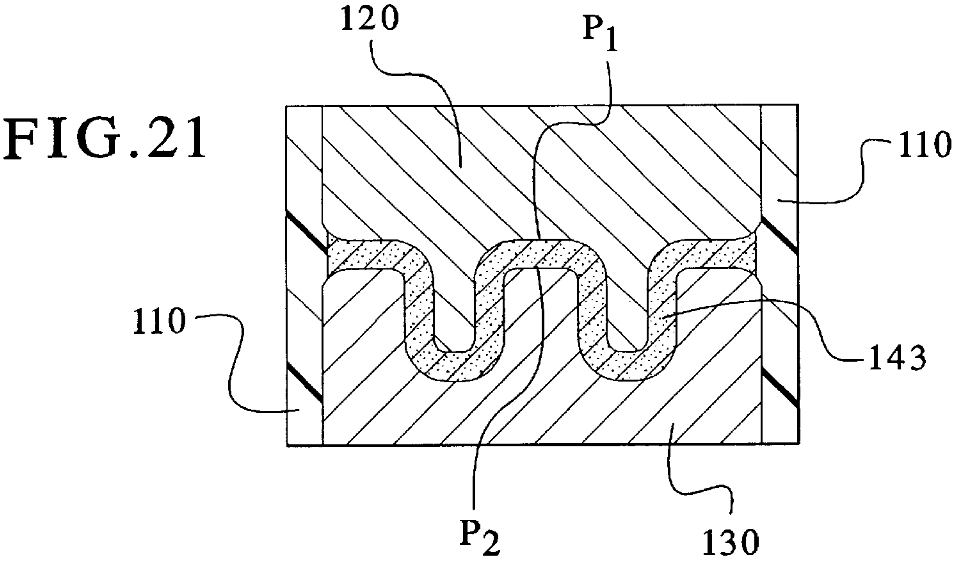
Figure 22:
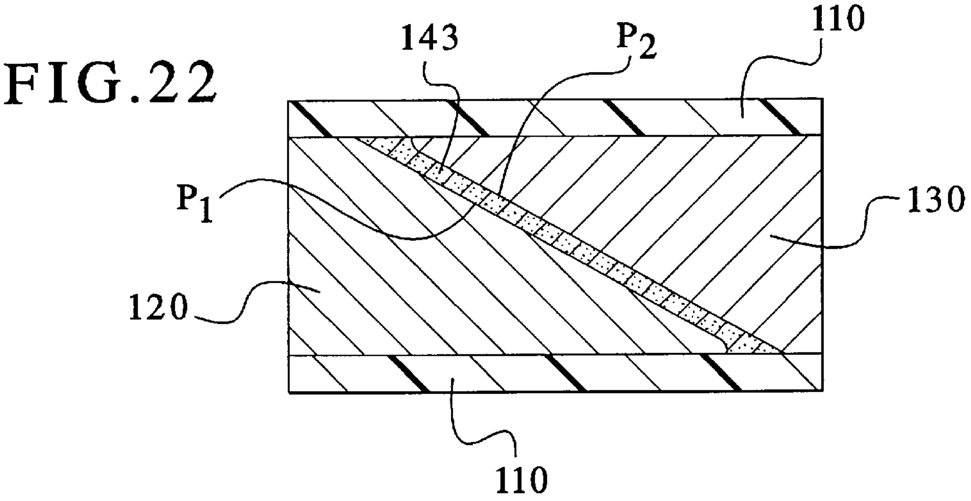
Figure 23:
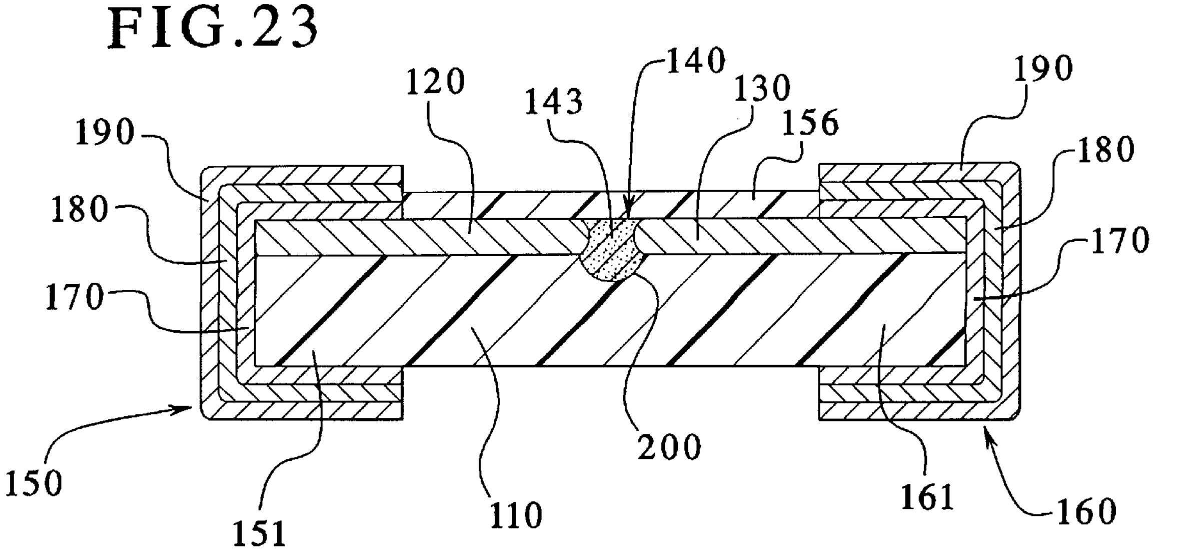
FIGS. 23–27 illustrate front views of devices having electrode profiles shaped according to various embodiments of the present invention.

With reference to FIGS. 15–17, there is disclosed an electrical device for protecting an electrical circuit from overvoltage fault conditions. The device 100 is comprised of a substrate 110. Preferably, the substrate 110 is electrically insulating. Suitable materials for the substrate are FR-4 epoxy or polyimide. First and second electrodes 120,130 are disposed on the substrate 110. Each electrode 120,130 has an electrode periphery, EP. The electrodes 120,130 are spaced apart from one another to form a gap region 140. In order to eliminate sharp electrode edges which increase electrical field concentrations the electrode peripheries, EP, in the gap region 140 are curvilinear. A voltage variable material 143 is disposed on the substrate 110 in the gap region 140. The material 143 electrically connects the first electrode 120 to the second electrode 130.

The electrodes 120,130 can be deposited on the substrate 110 according to the processes described above; e.g., plating or physical vapor deposition. The electrode metallization can be selected from a variety of elemental or alloy materials; i.e., copper, silver, nickel, titanium, aluminum, tin, etc., to obtain electrode layers which exhibit desired physical, electrical, and metallurgical characteristics. In the preferred embodiment, the electrodes comprise copper and are deposited via a conventional electroless plating technique. Through conventional photolithographic techniques and an etching process the gap width W2 between the electrodes 120,130 in the gap region 140 can be precisely controlled. Depending on the anticipated application of the protection device 100, the electrodes are spaced apart to form a gap width W2 in a range of about 0.5 mils to about 100 mils, preferably about 5 mils to about 75 mils, and especially about 10 mils to about 50 mils.

The voltage variable material 143 provides the protection from fast transient overvoltage pulses and provides for a non-linear electrical response to an overvoltage condition. The material 143 comprises finely divided particles dispersed in an organic resin or an insulating medium. The material 143 consists of conductive particles which are uniformly dispersed throughout an insulating binder; e.g., a polymer. This polymer material 143 exhibits a non-linear resistance characteristic which is dependent on the particle spacing and the electrical properties of the binder. This polymer voltage variable material 143 is available from many sources and is disclosed by a variety of patents as was mentioned above.

Prior to applying the voltage variable material 143, conductive terminals 150,160 are formed. Referring to FIGS. 23–27, the terminals wrap around the first end 151 and the second end 161 of the substrate 110, respectively. The first conductive terminal 150 is deposited on the bottom of the substrate 110 and wraps around the first end 151 of the substrate 110 to make an electrical connection with the first electrode 120. The second conductive terminal 160 is deposited on the bottom of the substrate 110 and wraps around the second end 161 of the substrate 110 to make an electrical connection with the second electrode 130. Preferably, the conductive terminals 150,160 are made up of several layers including a first supplemental copper layer 170, a second nickel layer 180 and a third tin-lead layer 190.

Figure 24:
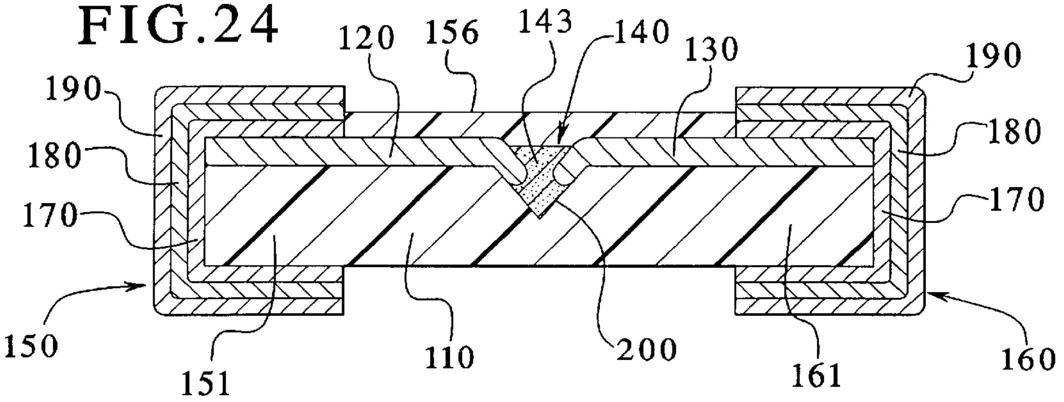
Figure 25A:
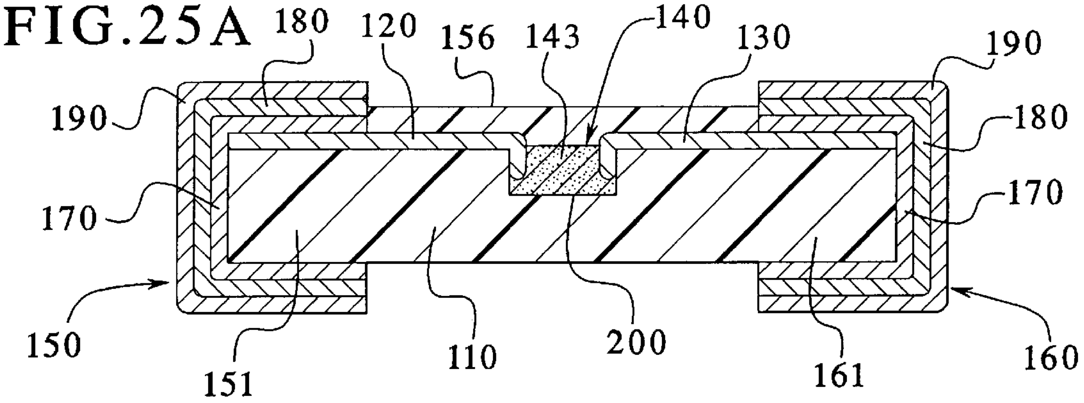
Figure 25B:
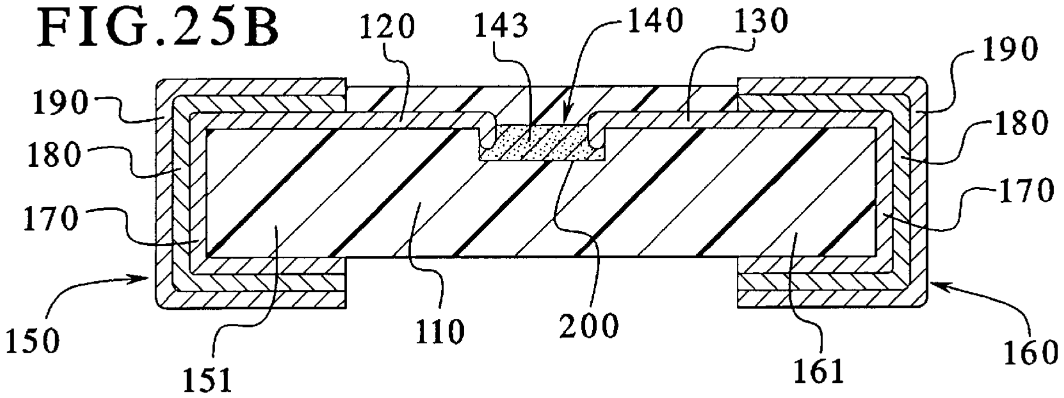

In the embodiments illustrated in FIGS. 23–25B, a portion of the substrate 110 is removed to form a cavity 200 in the gap region 140 between electrodes 120,130. The voltage variable material 143 is disposed within the cavity 200. The cavity 200 can be formed in the substrate 110 by conventional masking and etching process. In a preferred embodiment, the substrate has a thickness of 0.020 inch and the cavity has a minimum depth of 0.0015 inch. In order to increase the active area of the electrodes 120,130, that is the area of the electrodes in direct contact with the voltage variable 28 material 143, the electrodes 120,130 can be formed on the opposite walls of the cavity 200 as shown in FIGS. 24 and 25A–B. The cavity 200 permits more voltage variable material 143 to be disposed between the electrodes 120,130, and thus, increases the energy rating of the device without increasing the overall dimensions of the device.

The cover coat or protective layer 156 is applied after the electrode deposition, pattern definition, and voltage variable material 143 application process, to the top surface of the substrate to cover and protect the voltage variable material 143 and to provide a flat top surface for pick-and-place surface mount technology automated assembly equipment. The protective layer 156 prevents excessive oxidation of the electrodes 120,130 and the material 143 which can degrade and affect the electrical characteristics of the protection device 100. The protective layer 156 can be comprised of a variety of materials including plastics, conformal coatings, polymers, and epoxies. The protective layer 156 also serves as a vehicle for marking the protective devices 100 with the marking being placed between separate layers, or on the surface of the protective layer 156 through an ink transfer process or laser marking.

In a preferred embodiment illustrated in FIG. 25B, the electrode 120 and the first conductive layer 170 of the conductive wrap-around terminal 150 is comprised of a single continues metal layer, e.g., copper. Likewise, the electrode 130 and the first conductive layer 170 of the conductive wrap-around terminal 160 is comprised of a single continues metal layer, e.g., copper.

Figure 26:
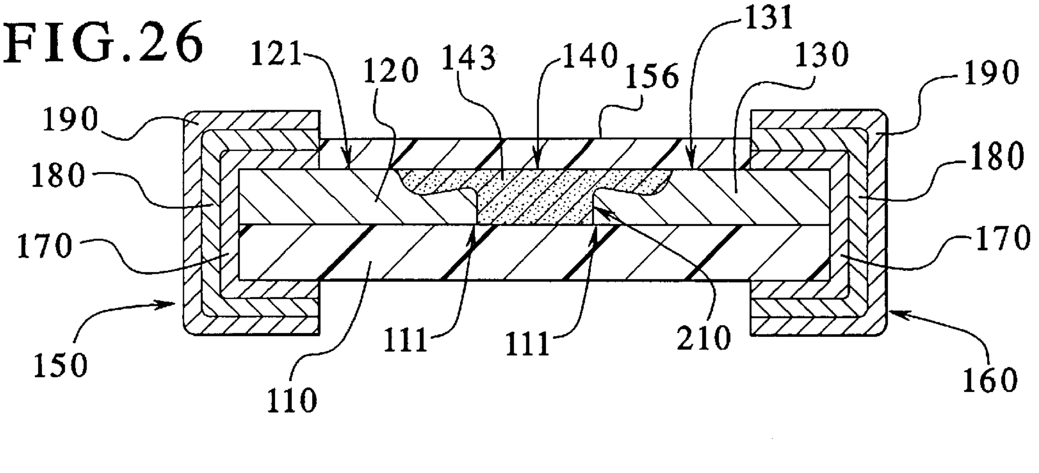
Figure 27:
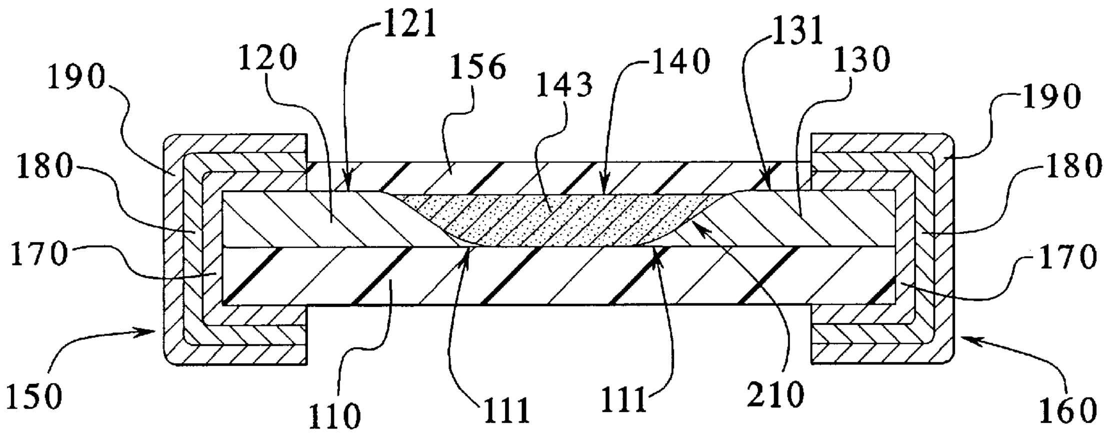

In the embodiments illustrated in FIGS. 26–28, the electrode profiles are shaped to form a containment region 210. For purposes of this application, the electrode profile is that portion of the electrode which lies between the surface of the substrate which the electrodes are formed on (indicated by reference numeral 111 in FIGS. 26–28) and the outer exposed surface of the electrode (indicated by reference numerals 121,131 in FIGS. 26–28). The voltage variable material 143 is disposed within the containment region 210. By shaping the profile of the electrodes 120,130 to create the containment region 210, the active area of the electrodes 120,130 (i.e., the surface area of the electrodes in direct contact with the material 143) can be increased, as well as the amount of voltage variable 143 packed between the electrodes. As a result, electrical field concentrations can be controlled and the energy rating of the device can be increased without increasing the overall dimensions of the device.

Referring specifically to FIG. 26, the electrodes 120,130 include a stepped profile. The edges of the stepped electrode profile are rounded to: (1) minimize electrical field concentrations; (2) improve reliability from pulse to pulse; and (3) simplify the manufacturing process. In a preferred embodiment the edges of the electrodes are rounded to a radius of approximately 0.002 inch. With reference to FIG. 27, the electrode profiles are generally sloped away from the surface of the substrate 110. For purposes of this application, a generally sloped electrode profile is any electrode profile which is not generally perpendicular to the substrate surface 111.

Figure 28A:
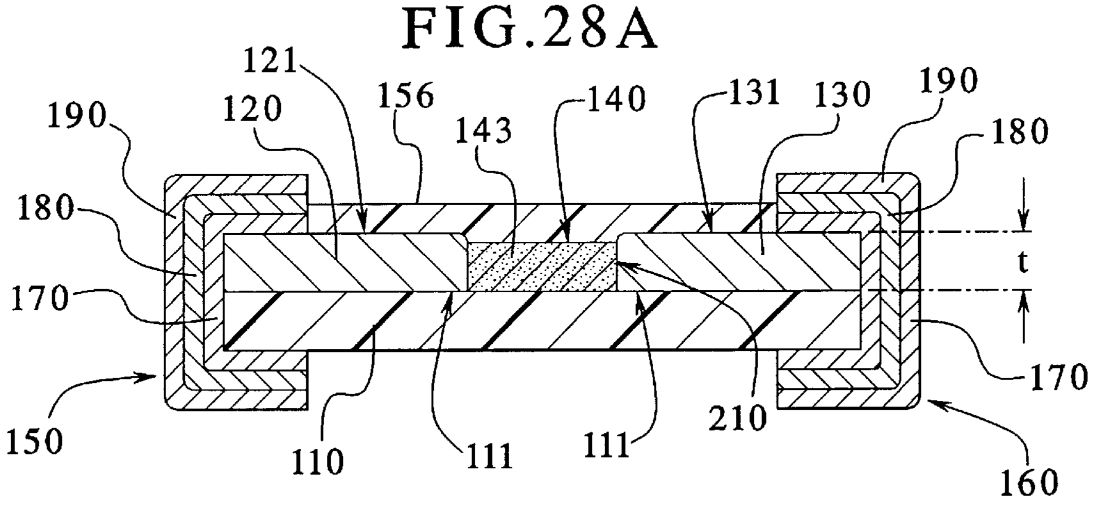
FIGS. 28A–C illustrate different embodiments of devices having a containment region for a voltage variable material according to the present invention.
Figure 28B:
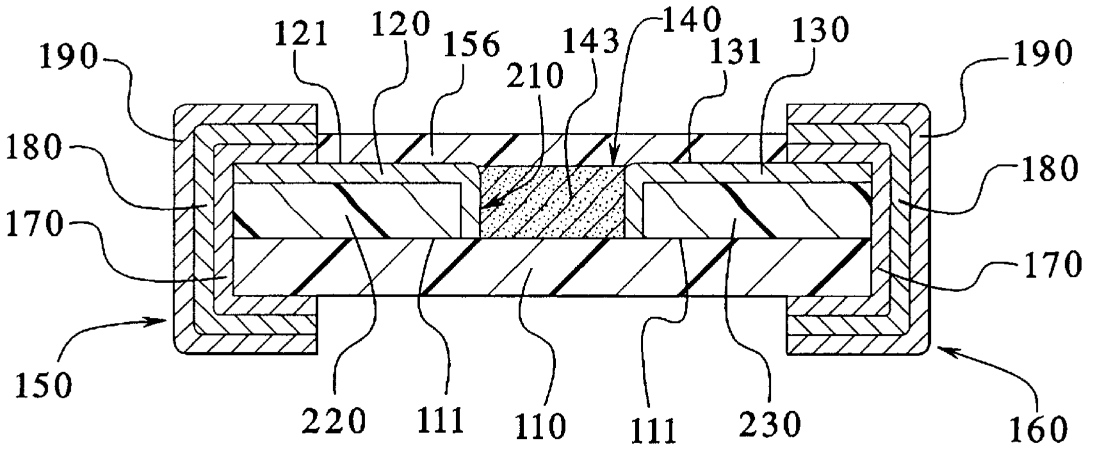
Figure 28C:
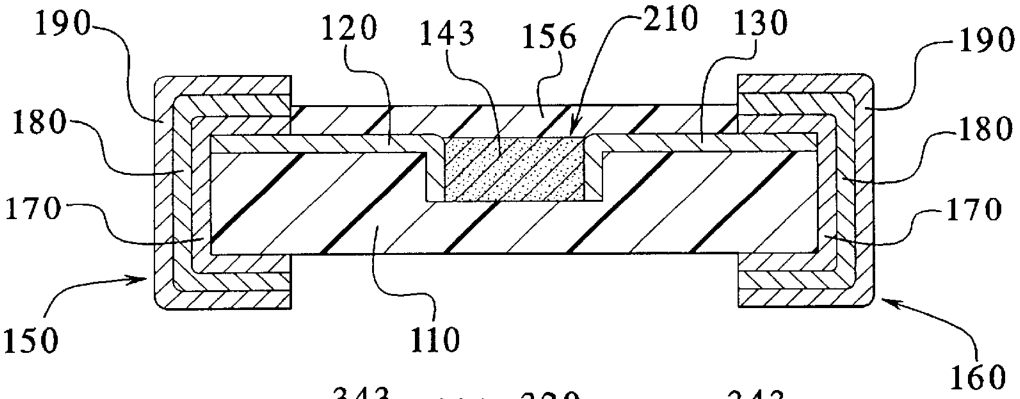

As illustrated in FIG. 28A, the volume of the voltage variable material 143 in the active electrode area (i.e., the surface area of the electrodes in direct contact with the material 143) can be increased by increasing the electrode thickness, t, to create the containment region 210. In a typical device, the electrodes 120,130 may have a thickness of approximately 0.001 to 0.002 inch. In the embodiment illustrated in FIG. 28A, the electrodes 120,130 have a thickness of greater than 0.003 inch; preferably between about 0.004 and 0.020 inch, especially between about 0.008 and 0.015 inch. Rather than increasing the electrode thickness, the volume of the material 143 in the active electrode area can be increased by either: (1) depositing the electrodes 120,130 on a pair of insulating layers 220,230 which are disposed on the substrate surface 111 to form a larger containment region 210 (as illustrated in FIG. 28B); or creating the containment region 210 by etching a deeper cavity in the substrate 110 as illustrated in FIG. 28C. In either embodiment, it is preferred that the electrodes 120, 130 are disposed in the cavity (i.e., are formed on the cavity walls) and even more preferably make contact with the substrate surface 111 in the containment region 210.

Figure 30:
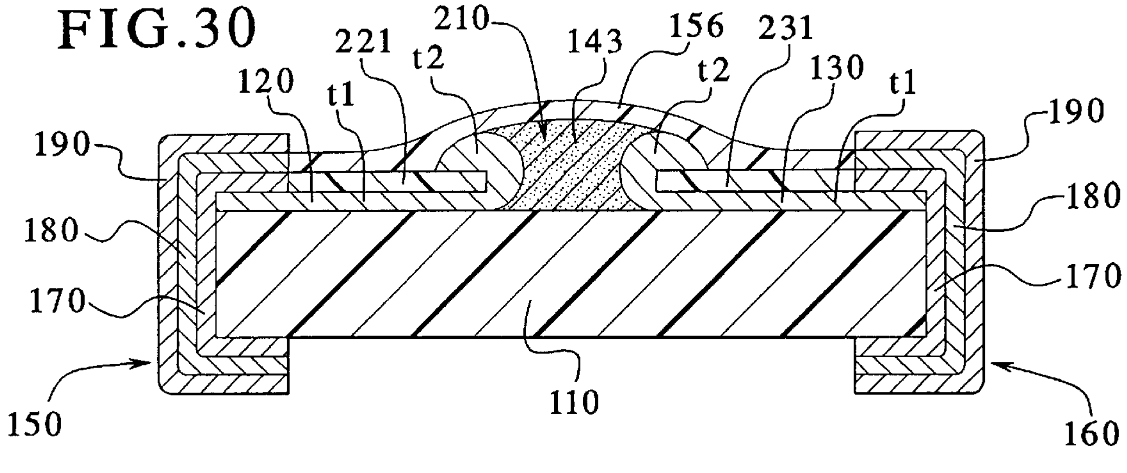
FIG. 30 illustrates a device having shaped electrodes according to a preferred embodiment of the present invention.

The present invention also shapes the electrodes 120,130 in three dimensions to minimize the electrical field concentrations and overshoot in the electrical device, improve overall reliability, and improve manufacturing economies since electrodes having curved edges are easier to manufacture than electrodes having sharp edges. With reference to FIG. 30, the electrodes 120,130 are selectively regrown to create a first and a second thickness t1,t2 and an overall rounded profile in the active electrode area.

The profile of the electrodes is shaped by conventional photolithographic and electrolytic deposition processes. In a preferred method, a continuous conductive layer is applied to the substrate surface. A photoimageable coating (PIC) is then applied to the PIC, developed, and rinsed away to expose a portion of the conductive layer. The exposed portion of the conductive layer is etched away creating a gap and first and second electrodes 120,130. The electrodes 120,130 are then regrown by electrolytically depositing metal around and over the PIC which remains on the electrodes 120,130. The result is a shaped electrode profile in the active electrode area. Preferably, the shaped profile has rounded edges and a thickness t2 greater than the thickness t1 of the rest of the electrode 120 or 130. For example in an especially preferred embodiment, t1 is in a range of 0.001 to 0.002 inch and t2 is in a range of greater than 0.002 to approximately 0.005 inch. The voltage variable material 143 is deposited between the regrown portions of the electrodes 120,130. Finally, a protective layer 156 is applied to the PIC layers 221,231, covering the voltage variable material 143 and portions of the regrown electrodes 120,130.

Referring now to FIGS. 18–22, the first and second electrodes 120,130 are disposed on the electrically insulating substrate 110 and have electrode peripheries $P_1$ and $P_2$. A portion of the first electrode periphery $P_1$ confronts a portion of the second electrode periphery $P_2$ to define an active electrode area. The path of the confronting electrode peripheries has a distance $D_c$. The portion of the electrode peripheries which are not confronting one another has a path distance $D_{nc}$. $D_c$ is greater than $D_{nc}$. A voltage variable material 143 is disposed on the substrate in the active electrode area and electrically connects the first electrode 120 to the second electrode 130. In order to increase the active electrode area and the volume of voltage variable material 143, in a preferred embodiment the electrode peripheries defining the active electrode area are curvilinear.

Figure 29:
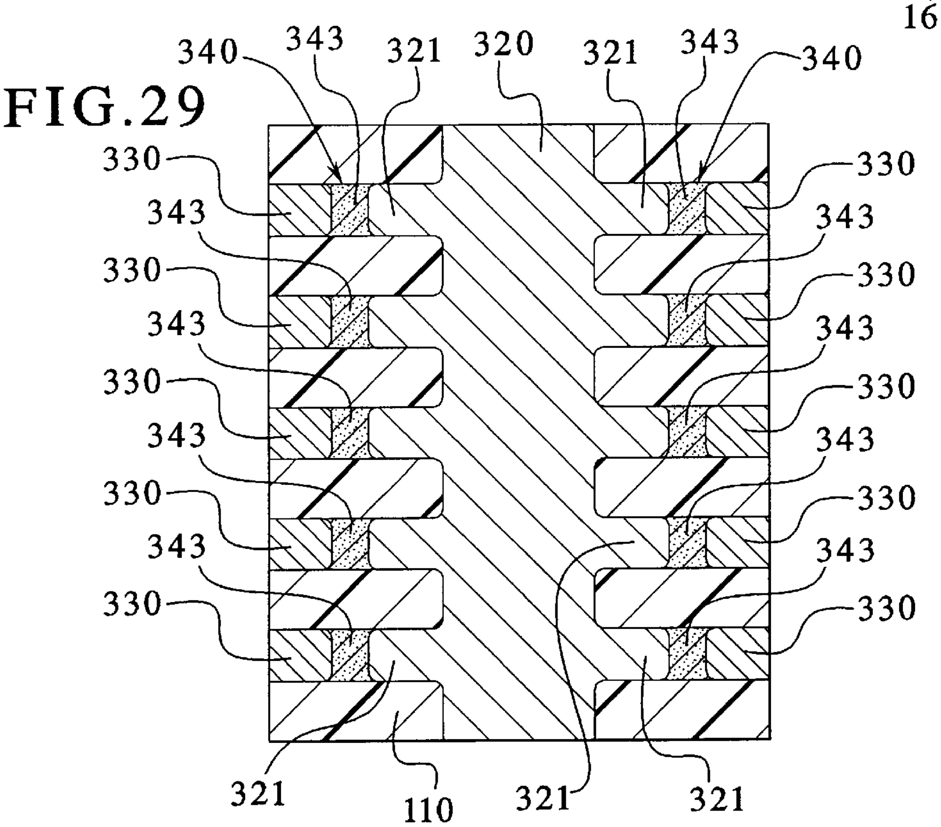
FIG. 29 illustrates a multiline electrical device according to the present invention.

With reference now to FIG. 29 there is shown a multiline electrical device 300 for protecting a plurality of electrical circuits. The device 300 comprises an electrically insulating substrate 110 having disposed on a surface thereof a first common electrode 320 and a plurality of second electrodes 330. The plurality of second electrodes 330 are spaced apart from and confront the first common electrode 320 to form a plurality of gap regions 340. A voltage variable material 343 is disposed within at least one of the plurality of gap regions 340 and electrically connects at least one of the plurality of second electrodes 330 to the first common electrode 320. In the preferred embodiment illustrated in FIG. 29, the first common electrode has a plurality of mating portions 321 which correspond to the number of plurality of second electrodes 330. A different body of voltage variable material 343 electrically connects each of the plurality of second electrodes 330 to a corresponding one of the plurality of mating portions 321 of the first common electrode 320.

However, it will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

What is claimed is:

1. An electrical circuit protection device comprising:

an electrically insulating substrate having a first surface;

first and second electrodes disposed on said first surface of said electrically insulating substrate, said electrodes being spaced apart from one another to form a gap region;

a portion of said substrate being removed to form a cavity in said gap region; and a voltage variable material disposed in said cavity of said gap region, said material connecting said first electrode to said second electrode.

2. The electrical circuit protection device of claim 1, wherein a first portion of the electrodes has a first thickness and a second portion of the electrodes has a second thickness, the first thickness being greater than the second thickness.

3. The electrical circuit protection device of claim 2, wherein the first portion of the electrodes are in direct contact with the voltage variable material.

4. The electrical circuit protection device of claim 2, wherein the first thickness is in a range of 0.001 to 0.002 inch and the second thickness is in a range of greater than 0.002 to 0.005 inch.

5. The electrical circuit protection device of claim 1 including a protective layer covering said voltage variable material.

6. The electrical circuit protection device of claim 1, wherein said substrate has a first end and a second end, a first conductive terminal wrapping around said first end of said substrate to make an electrical connection with said first electrode and a second conductive terminal wrapping around said second end of said substrate to make an electrical connection with said second electrode.

7. The electrical device of claim 6, wherein each of said first and said second conductive terminals are comprised of three conductive layers, the first conductive layer of said first and said second conductive terminals forming said first and said second electrodes.

8. The electrical device of claim 7, wherein said first conductive layer of said first conductive terminal and said first electrode is a single continuous metal layer.

9. The electrical device of claim 7, wherein said first conductive layer of said second conductive terminal and said second electrode is a single continuous metal layer.

10. The electrical circuit protection device of claim 1, wherein said electrodes are spaced apart from one another in said gap region by a distance in a range of about 0.5 to 100 mils.

11. An electrical circuit protection device comprising:

a substrate;

first and second electrodes disposed on said substrate and having electrode peripheries, said electrodes being spaced apart from one another to form a gap region;

a voltage variable material disposed on said substrate in said gap region, said voltage variable material connecting said first electrode to said second electrode; and said electrode peripheries in said gap region being curvilinear.

12. The electrical circuit protection device of claim 11, wherein said substrate has a substrate periphery and a majority of said electrode peripheries lie within said substrate periphery.

13. The electrical circuit protection device of claim 11, wherein a portion of said substrate in said gap region has been removed to form a cavity.

14. The electrical circuit protection device of claim 13, wherein said voltage variable material is disposed in said cavity.

15. The electrical circuit protection device of claim 13, wherein said cavity has a depth of at least 0.0015 inch.

16. The electrical circuit protection device of claim 11 including a protective layer covering said voltage variable material.

17. The electrical circuit protection device of claim 11, wherein said electrodes have a thickness in a range of about 0.004 inch to 0.020 inch.

18. An electrical circuit protection device comprising:

a substrate;

a first electrode disposed on said substrate and having a first electrode periphery;

a second electrode disposed on said substrate and having a second electrode periphery;

a portion of said first electrode periphery confronting a portion of said second electrode periphery to define an active electrode area, said confronting electrode peripheries having a periphery path distance, $D_c$;

said first and second electrode peripheries having non-confronting portions, said non-confronting portions of said peripheries having a periphery path distance, $D_{nc}$;

$D_c$ being greater than $D_{nc}$; and a voltage variable material disposed on said substrate in said active electrode area, said voltage variable material connecting said first electrode to said second electrode.

19. The electrical circuit protection device of claim 18, wherein said portions of said electrode peripheries defining said active electrode area are curvilinear.

20. The electrical circuit protection device of claim 18, wherein a portion of said substrate is removed in said active electrode area to form a cavity having a cavity surface, said electrodes being disposed on said cavity surface.

21. The electrical circuit protection device of claim 18, wherein said voltage variable material overlaps said electrode peripheries in said active electrode area.

22. The electrical circuit protection device of claim 18, wherein said electrodes have rounded profiles in said active electrode area.

23. The electrical circuit protection device of claim 18, wherein said electrodes have a thickness in a range of about 0.004 inch to 0.020 inch.

24. The electrical circuit protection device of claim 18, wherein said confronting portions of said first and second electrodes have a first thickness and said non-confronting portions of said first and second electrodes have a second thickness, the first thickness being greater than the second thickness.

25. An electrical circuit protection device for protecting a plurality of electrical circuits, said device comprising:

an electrically insulating substrate;

a first common electrode disposed on said substrate;

a plurality of second electrodes disposed on said substrate and spaced apart and confronting said first common electrode to form a plurality of gap regions; and a voltage variable material disposed on said substrate in at least one of said plurality of gap regions and connecting said first common electrode to at least one of said plurality of second electrodes.

26. The electrical circuit protection device of claim 25, wherein said first common electrode has a plurality of mating portions corresponding to said plurality of second electrodes.

27. The electrical circuit protection device of claim 25, wherein said voltage variable material connects each of said plurality of second electrodes to said first common electrode.

28. The electrical circuit protection device of claim 25, wherein each one of said plurality of second electrodes has a mating portion and said first common electrode has a corresponding plurality of mating portions, said mating portions of said plurality of second electrodes being spaced apart from the corresponding mating portions of the first common electrode to form said plurality of gaps and said voltage variable material being disposed in said plurality of gaps to connect said mating portions of said plurality of second electrodes with said corresponding plurality of mating portions.

29. The electrical circuit protection device of claim 25, wherein the electrodes have a thickness in a range of about 0.004 inch to 0.020 inch.

30. An electrical circuit protection device comprising:

a substrate;

first and second electrodes disposed on said substrate and having electrode peripheries, said electrodes being spaced apart from one another to form a gap region;

each said electrode having a generally sloped profile in said gap region;

a voltage variable material disposed on said substrate and said sloped profile of said electrodes in said gap region, said voltage variable material electrically connecting said first electrode to said second electrode.

31. The electrical circuit protection device of claim 30, wherein said sloped electrode profiles and said substrate form a containment region, said voltage variable material being disposed in said containment region.

32. An electrical circuit protection device comprising:

a substrate;

first and second electrodes disposed on said substrate and having electrode peripheries, said electrodes being spaced apart from one another to form a gap region;

each said electrode having a stepped profile in said gap region;

a voltage variable material disposed on said substrate and said stepped profile of said electrodes in said gap region, said voltage variable material electrically connecting said first electrode to said second electrode.

33. The electrical circuit protection device of claim 32, wherein said stepped electrode profiles and said substrate form a containment region, said voltage variable material being disposed in said containment region.

34. The electrical circuit protection device of claim 32, wherein said stepped electrode profiles have rounded edges.

* * * * *